US011093763B2

(12) United States Patent
Takemura et al.

(10) Patent No.: US 11,093,763 B2
(45) Date of Patent: Aug. 17, 2021

(54) ONBOARD ENVIRONMENT RECOGNITION DEVICE

(71) Applicant: Hitachi Automotive Systems, Ltd., Hitachinaka (JP)

(72) Inventors: Masayuki Takemura, Tokyo (JP); Shouji Muramatsu, Hitachinaka (JP); Felipe Gomezcaballero, Tokyo (JP); Takeshi Shima, Tokyo (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/764,959

(22) PCT Filed: Dec. 4, 2018

(86) PCT No.: PCT/JP2018/044482
§ 371 (c)(1),
(2) Date: May 18, 2020

(87) PCT Pub. No.: WO2019/116958
PCT Pub. Date: Jun. 20, 2019

(65) Prior Publication Data
US 2020/0349366 A1 Nov. 5, 2020

(30) Foreign Application Priority Data
Dec. 13, 2017 (JP) .............................. JP2017-238238

(51) Int. Cl.
*H04N 13/239* (2018.01)
*G06K 9/00* (2006.01)
(Continued)

(52) U.S. Cl.
CPC .......... *G06K 9/00805* (2013.01); *B60Q 9/00* (2013.01); *G06T 5/002* (2013.01); *G06T 7/20* (2013.01);
(Continued)

(58) Field of Classification Search
CPC .......... G06K 9/00805; G06K 9/00798; G06K 9/00342; G06K 9/00818; G06T 7/593;
(Continued)

(56) References Cited

U.S. PATENT DOCUMENTS

2015/0235093 A1* 8/2015 Shima ...................... G06K 9/46
382/103
2018/0281757 A1* 10/2018 Matsuo .............. G06K 9/00805

FOREIGN PATENT DOCUMENTS

JP 2010-079582 A 4/2010
JP 2014-067198 A 4/2014
(Continued)

OTHER PUBLICATIONS

International Search Report with English translation and Written Opinion issued in corresponding application No. PCT/JP2018/044482 dated Mar. 19, 2019.

*Primary Examiner* — Masum Billah
(74) *Attorney, Agent, or Firm* — Foley & Lardner LLP

(57) ABSTRACT

The purpose of the present invention is to provide an onboard environment recognition device exhibiting high accuracy of measurement in a wider range of view fields. The present invention pertains to an onboard environment recognition device (1) that utilizes two cameras (100, 110) for sensing, wherein the onboard environment recognition device (1) is characterized in that: two camera view fields include a stereo-vision area and a monocular-vision area; and the device laterally searches for parallax images that are output results of the stereo-vision area, estimates a road surface distance in the stereo-vision area, and measures the distance of the monocular-vision area by using the estimated road surface distance after extending the same to the monocular-vision area in the lateral direction.

7 Claims, 18 Drawing Sheets

(51) Int. Cl.
| | |
|---|---|
| *G06T 7/593* | (2017.01) |
| *G06T 7/70* | (2017.01) |
| *H04N 13/286* | (2018.01) |
| *B60Q 9/00* | (2006.01) |
| *G06T 5/00* | (2006.01) |
| *G06T 7/20* | (2017.01) |

(52) U.S. Cl.
CPC ............... *G06T 7/593* (2017.01); *G06T 7/70* (2017.01); *H04N 13/239* (2018.05); *H04N 13/286* (2018.05); *G06T 2207/30261* (2013.01)

(58) Field of Classification Search
CPC ................... G06T 7/70; H04N 13/239; H04N 2013/0081; H04N 5/232; H04N 13/133; H04N 13/189; H04N 5/225; H04N 13/167; H04N 13/20; H04N 13/204; H04N 13/207
USPC .......................................................... 348/47
See application file for complete search history.

(56) References Cited

FOREIGN PATENT DOCUMENTS

| | | |
|---|---|---|
| JP | 2017-096777 A | 6/2017 |
| WO | WO-2017/159056 A1 | 9/2017 |
| WO | WO-2017159056 A1 * | 9/2017 ............... G08G 1/16 |

* cited by examiner

FIG. 10
(a)
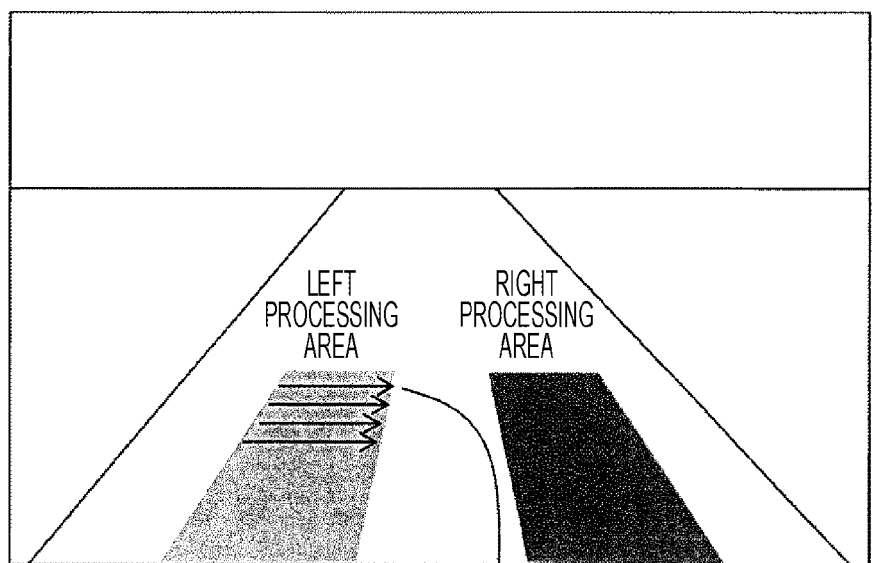
(b)
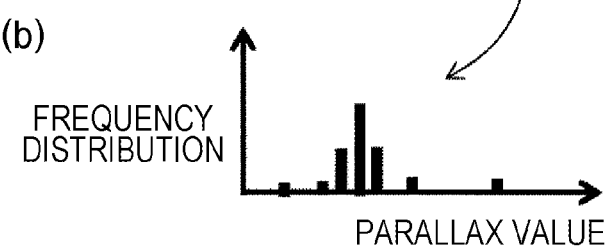

FIG. 13
(a)
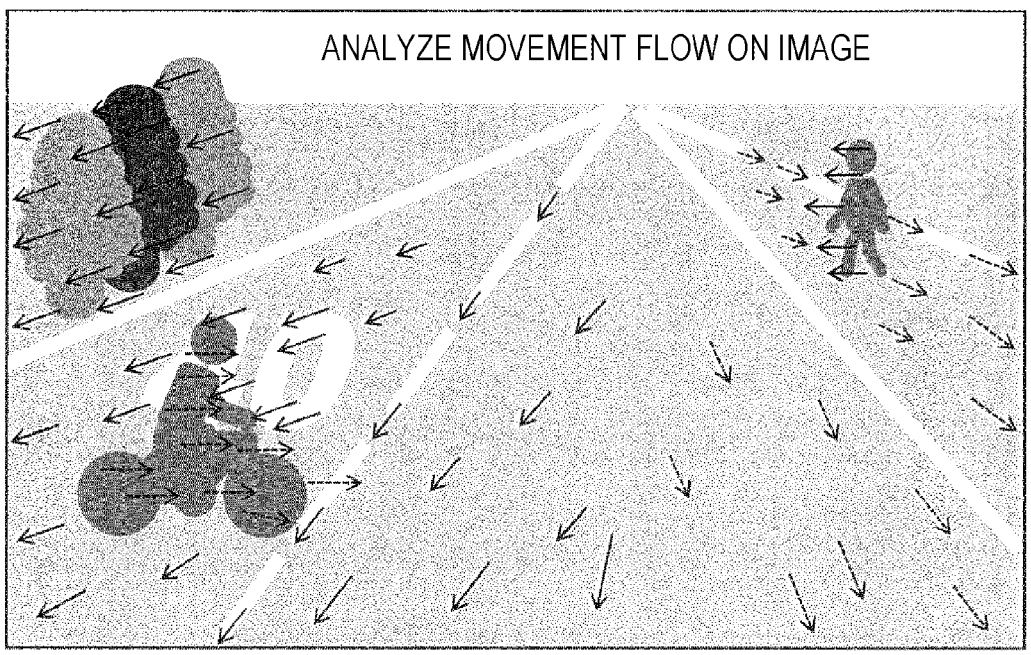
(b)
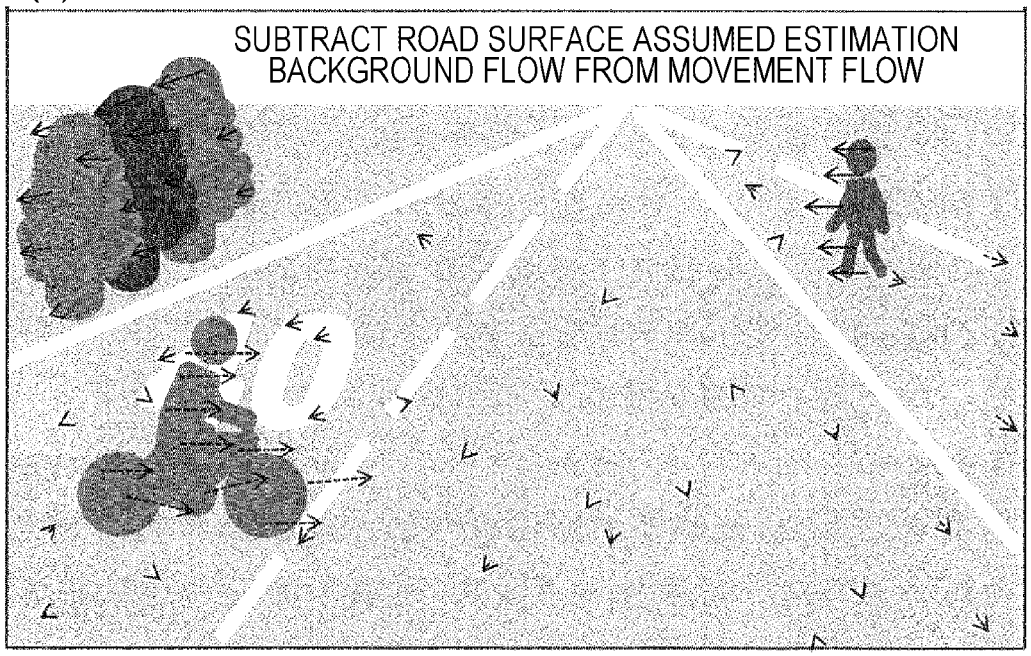

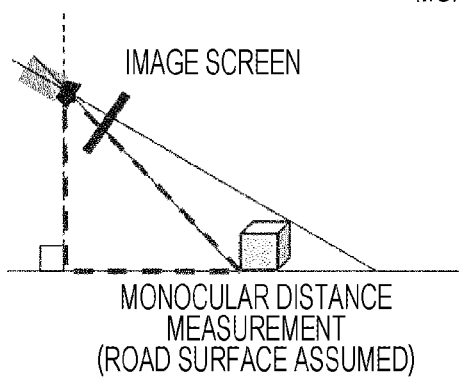

MONOCULAR DISTANCE MEASUREMENT (ROAD SURFACE ASSUMED)

- MONOCULAR METHOD
  - ROAD SURFACE ASSUMED TRIANGULATION
  - ERROR FACTORS
    - INCLINATION OF CAMERA OR ROAD SURFACE (VEHICLE BODY SWAYING, LOADING POSITION, TILTING OR THE LIKE)
    - HEIGHT OF CAMERA (LOADED AMOUNT, TIRE AIR PRESSURE, STEPPED PORTION)
  - LOW DISTANCE ACCURACY (b)

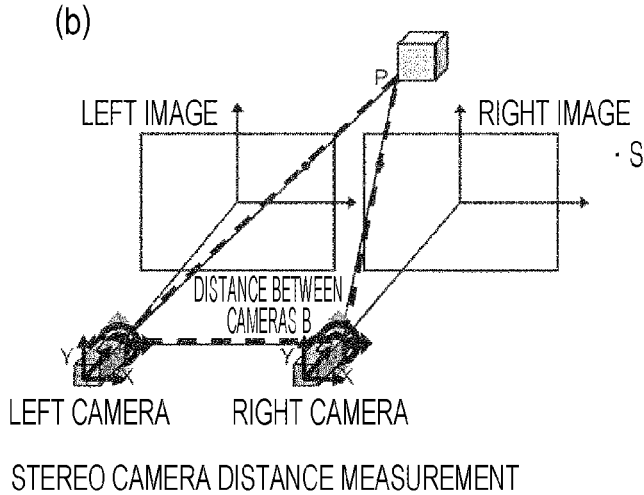

STEREO CAMERA DISTANCE MEASUREMENT

- STEREO METHOD
  - STEREO-VISION TRIANGULATION
  - ERROR FACTORS
    - POSITION BETWEEN LEFT AND RIGHT CAMERAS, POSTURE ERROR (SMALL)
  - HIGH DISTANCE ACCURACY

FIG. 16
(a) OVERVIEW OF HYBRID MOBILE BODY EXTRACTION TECHNIQUE
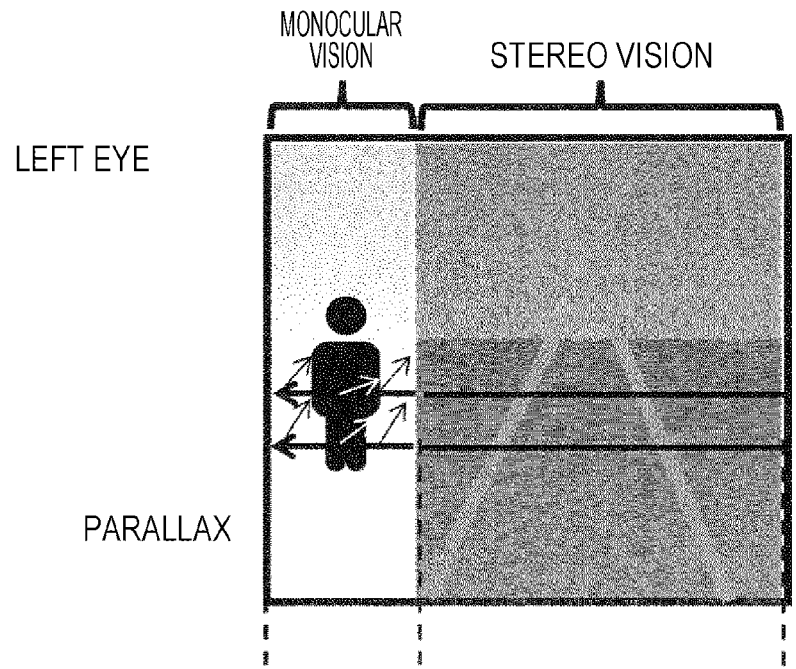
(b) OVERVIEW OF HYBRID POSITION ESTIMATION TECHNIQUE
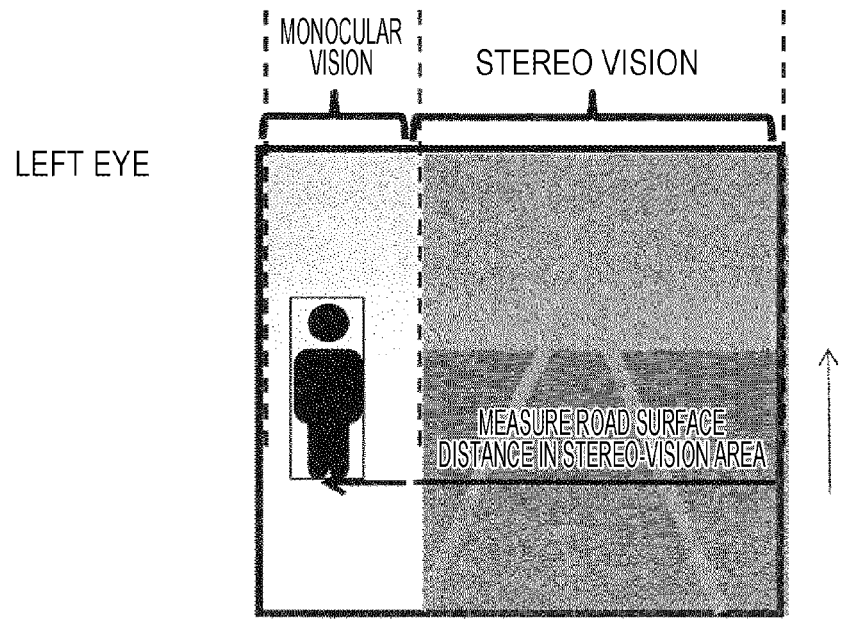
MEASURE PARALLAX AT THE SAME
LATERAL POSITION AS POSITION
OF FOOT OF PEDESTRIAN

| DISTANCE MEASUREMENT TECHNIQUE | ALARM | SUPPRESSED ACCELERATION | WEAK DECELERATION | STRONG DECELERATION |
|---|---|---|---|---|
| 1) MONOCULAR-VISION DISTANCE MEASUREMENT TECHNIQUE | O | | | |
| 2) MONOCULAR-VISION CORRECTED DISTANCE MEASUREMENT TECHNIQUE | O | O | | |
| 3) STEREO PREDICTED DISTANCE MEASUREMENT TECHNIQUE | O | O | O | |
| 4) STEREO-VISION DISTANCE MEASUREMENT TECHNIQUE | O | O | O | O |

ONBOARD ENVIRONMENT RECOGNITION DEVICE

TECHNICAL FIELD

The present invention relates to an onboard environment recognition device which detects a surrounding environment of an own vehicle by using cameras, and outputs information necessary for control of the own vehicle and alarming.

BACKGROUND ART

With respect to vehicles, a preventive safety technique has been spreading nowadays in the form of manufacturing devices which can realize such a preventive safety technique. As a result, sensing devices which have multiple functions and a wide view field can be obtained at a low cost. With respect to a sensing technique which enables the recognition of the surrounding environment of a vehicle using two cameras, PTL 1 describes a technique for detecting a mobile body by using stereo-vision cameras. That is, the technique effectively utilizes a common view field as a stereo-vision area and monocular-vision areas which inevitably remain on left and right sides of the stereo-vision area.

CITATION LIST

Patent Literature

PTL 1: JP 2014-67198 A

SUMMARY OF INVENTION

Technical Problem

In the preventive safety technique applied to a vehicle, an obstacle is detected by making use of a plurality of cameras mounted on the vehicle, and the occurrence of an accident is prevented by performing alarming and control based on a positional relationship between an obstacle and an own vehicle. In this case, when the positional relationship among the plurality of camera positions is already known, processing for restoring a three-dimensional shape in a common view field area of the plurality of cameras becomes extremely easy and, at the same time, the three-dimensional shape can be restored with high accuracy. However, although such restoring of the three-dimensional shape possible in the common view field, there is no possibility that viewing field angles of the plurality of cameras having different installation positions become common. Accordingly, monocular-vision areas where view field angles do not become common inevitably remain. Sensors having a wider view field and manufactured at a low cost are required and hence, utilization of such monocular-vision areas is desired.

However, in general, to compare the monocular vision with stereo vision, the monocular vision exhibits low distance measurement performance.

In the monocular vision, in case of an object whose size is already known or an object which moves at a fixed speed, there exists a technique which exhibits high distance measurement accuracy. However, in a case where an own vehicle behavior is taken into account, not only an error is added but also, in a case where a counterpart is a pedestrian, a shape of the pedestrian is uncertain, there is no guarantee that the pedestrian walks at a fixed speed, and deformation of the pedestrian while walking is also added. Accordingly, distance measurement with high accuracy becomes difficult.

Further, in a triangulation method which estimates a road surface based on a foot position, a height and an angle of a camera change also depending on pitching of the own vehicle or the number of occupants in the vehicle. Further, when the road surface is not a flat surface such as a slope, accuracy of a distance measurement technique is lowered.

Compared to the above-mentioned measurement, in the stereo vision portion, by calculating the positions and the postures of the left and right cameras with high accuracy in advance, distance measurement can be performed on a premise that the positions and postures of the left and right cameras do not largely change during traveling, and hence, the measurement with considerably high accuracy can be expected. However, the accurate distance measurement can be performed only in the common portion of the left and right cameras. From a viewpoint of performing vehicle control for achieving preventive safety by further widening a view field, it is desirable to improve a distance measurement performance in a monocular-vision area.

Accordingly, it is an object of the present invention to provide an onboard environment recognition device which exhibits high measurement accuracy in a wider view field.

Solution to Problem

In the present invention, by making use of a plurality of cameras mounted on a vehicle, an obstacle is detected and distance measurement is performed using a stereo vision in a common view field area, and a distance measured in the stereo-vision area is utilized also in a monocular-vision area.

Advantageous Effects of Invention

According to the present invention, it is possible to realize an onboard environment recognition device with high measurement accuracy in a wider view field.

BRIEF DESCRIPTION OF DRAWINGS

FIG. 10 is a view for describing processing contents of road surface cross-sectional shape estimation.

FIG. 13 is a view for describing flow extraction of feature points.

FIG. 14 is a view for describing respective distance measurement methods.

FIG. 16 is a view for describing an overview of the hybrid method.

DESCRIPTION OF EMBODIMENTS

This embodiment is characterized by a technique which performs distance measurement in accordance with a following method. With respect to an onboard camera where two cameras are used for sensing, the onboard camera has a stereo-vision area and monocular-vision areas, a road surface depth estimation result in the stereo-vision area is used in the monocular-vision area. With the use of such a technique, compared to a distance measurement result obtained on y by a conventional monocular vision, this embodiment can realize distance measurement with high accuracy. The present invention is not limited by the following embodiments in any case, and the present invention can be carried out by suitably adding, changing or deleting constitutional elements of respective units of the embodiments without departing from the gist of the present invention.

The embodiments are described with reference to the drawings hereinafter.

Embodiment 1

Figure 1:
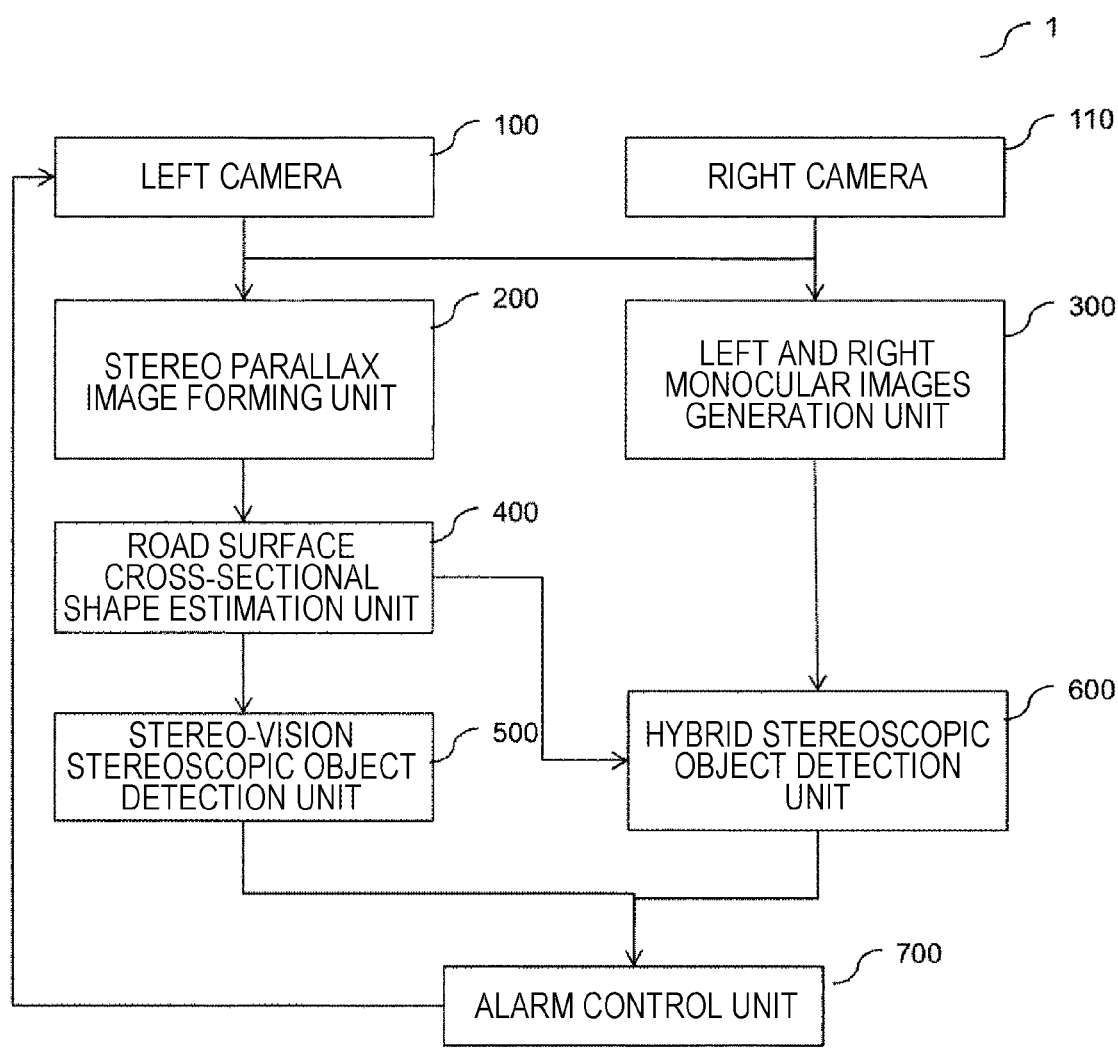
FIG. 1 is a block diagram showing the configuration of an onboard environment recognition device.

FIG. 1: Onboard Environment Recognition Device 1

Figure 9:
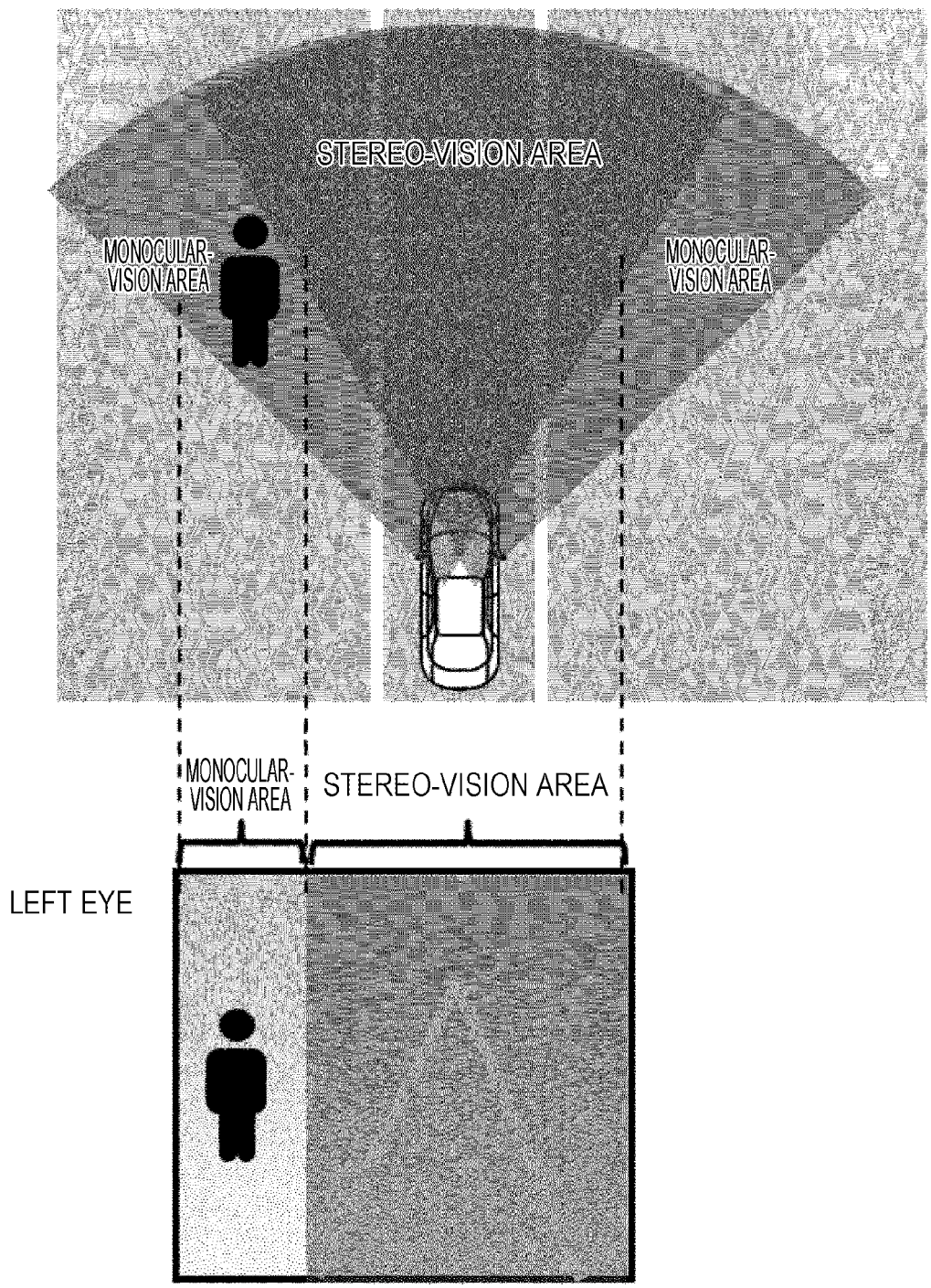
FIG. 9 is a view for describing one image state using a stereo vision and monocular vision.

FIG. 1 is a block diagram showing the configuration of the onboard environment recognition device 1. An onboard surrounding environment is recognized using a common view field area of a left camera 100 and a right camera 110 arranged parallel to each other on left and right sides as a stereo camera. However, as shown in FIG. 9 which is a view for describing an image state formed of a stereo vision and a monocular vision, in the case of the stereo camera where the cameras are disposed on left and right sides, even when an attempt is made to maximize the common view field area, the monocular-vision areas remain inevitably on left and right ends. Further, in this embodiment, the stereo vision having high distance measurement performance is allocated to an area in front of the own vehicle which is particularly important in distance measurement. On the other hand, a monocular vision which exhibits lower measurement distance performance more or less is allocated to cover a wide angle area where activity is small in a general traveling scene although it is important in distance measurement such as an intersection where the detection of a person who rushes out becomes necessary. In this manner, although a CMOS and a lens having the same resolutions are used, the cameras are arranged such that the detection with a wider angle can be performed.

Usually, in an attempt to realize sensing in a wide angle using a stereo camera without lowering a maximum detection distance of an area in front of the own vehicle, a lens is changed to a wide-angle lens while increasing the resolution of a CMOS. On the other hand, this embodiment adopts the following method. By taking into account an accident, preventive safety, frequency of operation of useful functions and priority order, a stereo vision having high accuracy is allocated to an area in front of a vehicle and a monocular vision is allocated to a wide angle portion and, further, an amount which is obtained by reducing the common view field area which can be maximized is allocated to the monocular-vision area and hence, sensing possible range is enlarged.

In a stereo parallax image forming unit 200, left and right images captured by the left camera 100 and the right camera 110 are used. In performing stereo matching using a right image as a base, basically, it is assumed that sensitivity, geometry and the like are matched to the right reference. A parallax image is formed by performing stereo matching using images of the left and right cameras to which the correction of geometry and sensitivity is applied, and noise removing is finally performed thus obtaining a parallax image from which noise is removed.

By using the parallax image from which the noise is removed, the road surface cross-sectional shape estimation unit 400 estimates a road surface cross-sectional shape of an own vehicle advancing scheduled road.

A stereo vision cannot be applied to areas which are not the common view field area of the left and right cameras and hence, left and right monocular image forming units 300 respectively form left and right monocular-vision images.

A stereo-vision stereoscopic object detection unit 500 performs detection of a stereoscopic object using a parallax image.

Along with detection of a stereoscopic object, by identifying whether or not the stereoscopic object is a pedestrian, a bicycle, a vehicle or the like, a kind of stereoscopic object used for preventive safety is identified. When a vehicle is detected as a detection result, the result is used for allowing the own vehicle to follow a preceding vehicle or to perform braking control in emergency. When a pedestrian or bicycle is detected as a detection result, the result basically corresponds to emergency braking, and the result is particularly used for alarming or control of the pedestrian or the bicycle who rushes out. Alarming or control of an object in a wide view field range performed with respect to an object which rushes out compared to a stationary object. By measuring a distance to such a detected object and also by estimating a moving speed of an object which is tracked time-sequentially, more appropriate alarming and control can be performed by an alarm control unit 700.

A hybrid stereoscopic object detection unit 600 detects a stereoscopic object or a mobile body which forms an obstacle by a monocular vision and, further, in the same manner as a stereo vision, identifies a pedestrian, a bicycle, a vehicle or the like for identifying a kind of the stereoscopic object or the mobile body by pattern matching. By utilizing the position obtained in a stereo vision obtained by the road surface cross-sectional shape estimation unit 400 in addition to information on the monocular vision, an obstacle can be detected with more accuracy in a stable manner. With respect to the accuracy of the position of the detected object, the position, the speed, the shape and the like of the object are estimated by a hybrid method by referencing an available distance measurement method and distance accuracy for each method.

Appropriate alarm and control are performed depending on the position, the distance, the shape of the object estimated by a plurality of these methods, and a kind of an identified obstacle.

Figure 2:
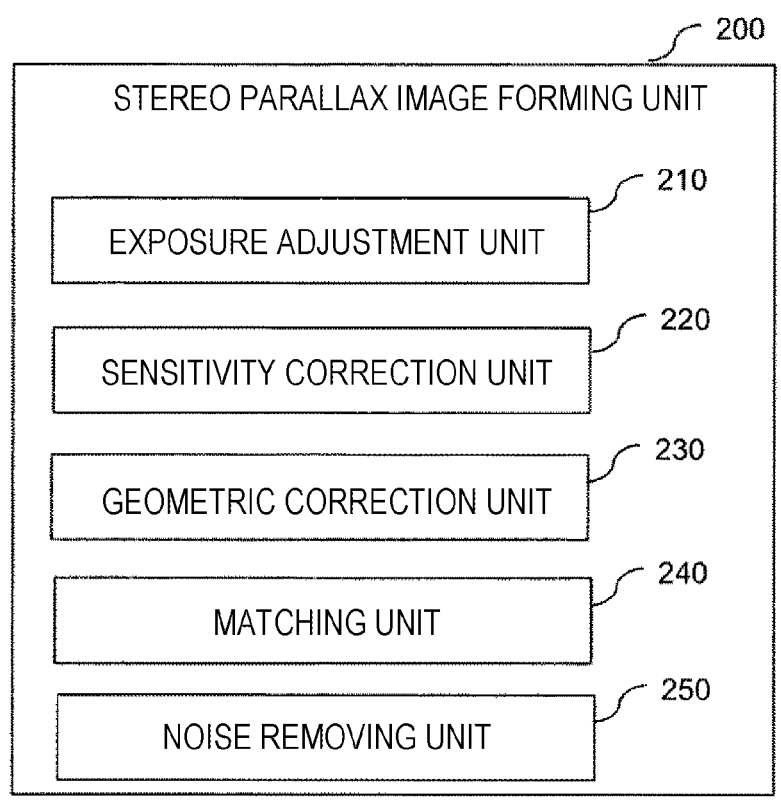
FIG. 2 is a block diagram showing the configuration of a stereo parallax image forming unit.

FIG. 2: Stereo Parallax Image Forming Unit 200

FIG. 2 is a view showing the configuration of the stereo parallax image forming unit. The stereo parallax image forming unit 200 forms a parallax image by performing stereo matching using images captured by the plurality of cameras. An exposure adjustment unit 210 performs, to set the left and right exposure conditions equal, feedback control such that the exposure conditions in a time frame become appropriate by analyzing brightness of a right image using an image obtained by the right camera as a reference image. The left and right exposure conditions are set equal by applying the camera exposure condition obtained based on the right image to the left camera also. With respect to the images captured by the left camera 100 and the right camera 110, the correction of sensitivity is performed such that the same object to be imaged appears equal as much as possible by the left and right cameras. Calibration is performed in advance with respect to the left and right sensitivity difference, shading which lowers sensitivity around a lens and sensitivity of a defective pixel or the like, and at time of performing image processing at real time, only the correction is performed by a sensitivity correction unit 220 by referencing such a corrected value.

Further, in a geometric correction unit 230, distortion of a lens is corrected or the left and right images are made parallel to each other using a result of calibration performed in a factory or the like in advance. After the sensitivity correction and geometric correction are performed, stereo matching is performed by a matching unit 240 using images of the left and right cameras thus forming a parallax image. Among parallaxes of the obtained parallax image, noise factors are included such as a noise factor that the texture is insufficient so that reliability of the parallax is low or the noise factor that a matching result (a degree of similarity) at plural portions is high so that there is a concern that a periodic pattern is formed. A noise removing unit 250 removes such noise factors.

Figure 3:
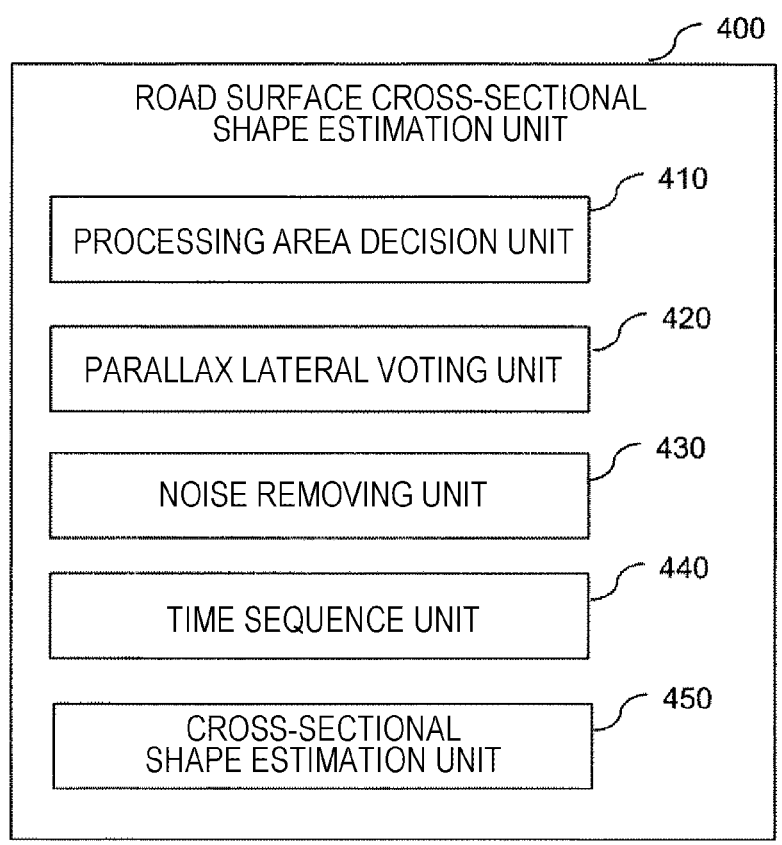
FIG. 3 is a block diagram showing the configuration of a road surface cross-sectional shape estimation unit.

FIG. 3: Road Surface Cross-Sectional Shape Estimation Unit 400

FIG. 3 is a view showing the configuration of the road surface cross-sectional shape estimation unit. The road surface cross-sectional shape estimation unit 400 estimates a cross-sectional shape of a road surface by analyzing a height of a road surface transversely. First, in a processing area decision unit 410, an advancing road of the own vehicle is estimated, and the advancing road where left and right tires are predicted to advance as shown in (a) of FIG. 10 is set as a processing area. Next, a parallax lateral voting unit 420 analyzes a parallax image which forms the inside of the processing area. As indicated by arrows in the left processing area in (a) of FIG. 10, a parallax image is analyzed in the direction of arrows, and parallax values are voted in a graph of frequency distribution as shown in (b) of FIG. 10. By narrowing the own vehicle advancing road, a processing area is formed such that the own vehicle advancing road does not include undulation other than a road surface such as a shoulders of a road or grooves as much as possible. Substantially, the same effects can be acquired by setting an own vehicle traveling lane as the processing area in place of the own vehicle advancing road.

As a result of the above-mentioned analysis, when the whole surface is a road surface, votes are gathered to a certain parallax value and hence, it is possible to analyze a three-dimensional shape of the road surface using this most frequent value as a representative parallax of the road surface. As a matter of course, when the number of parallax values voted on the graph is extremely small, when the parallax values are excessively dispersed or the parallax values have no regularity, there may be a case that the road surface may lack a representative parallax at a deep side. Further, from a result of the stereo vision, when a stereoscopic object exists in own vehicle advancing road so that a road surface remote from a certain deep side cannot be observed, a road surface cross-sectional shape is estimated until such a deep side, and a flag which indicates that the road surface cross-sectional shape beyond the deep side cannot be estimated is preserved.

This processing is performed on left and right sides separately. That is, in the processing order where one graph is formed with respect to one lateral row of the processing area, a graph is formed many times in a longitudinal direction of an image one by one as indicated by an arrow in (a) of FIG. 10. Thus processing to acquire a representative value is repeated.

Figure 11:
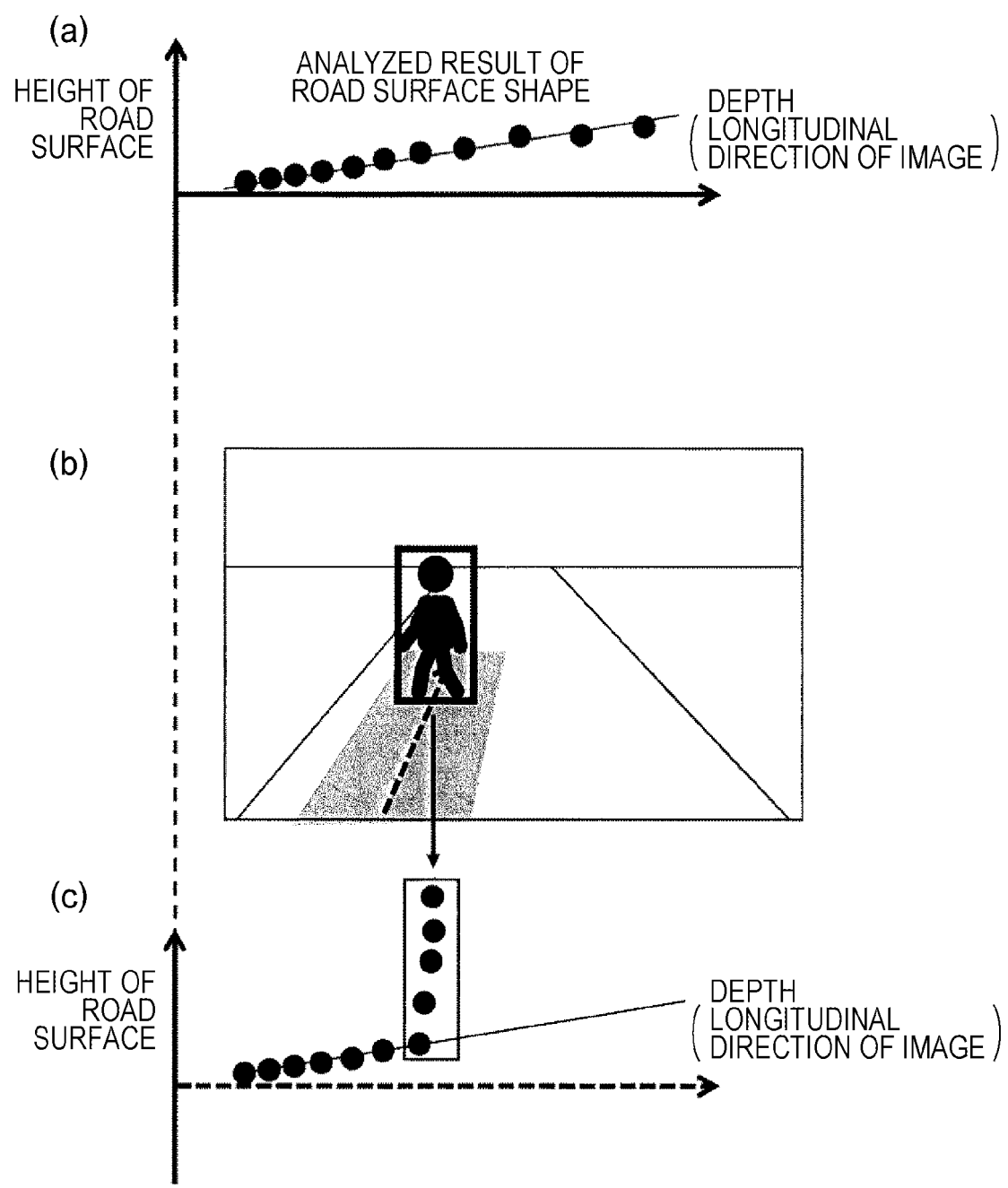
FIG. 11 is a view for describing processing contents of road surface cross-sectional shape estimation.

As a result, as shown in (a) of FIG. 11, it is possible to form a graph of a road surface height where a longitudinal direction (depth) of an image is taken on an axis of abscissas, and a height of a road surface is taken on an axis of ordinates. The graph is formed after performing the finding in the lateral direction described previously, and one point on the graph can be depicted by performing processing which extracts a most frequent value. The points on graph are added one by one corresponding the heights of the parallax image. In this case, however, the road surface height in a state where no noise factors exist is drawn. However, in an actual operation, the graph is formed in a state where there is no parallax of the road surface or noise remains. Further, in a case where a pedestrian actually exists on a road surface, to analyze the inside of the processing area as shown in (b) of FIG. 11, it is sufficiently probable that a graph showing a road surface analysist result shown in (c) of FIG. 11 is obtained.

A noise removing unit 430 extracts a portion where the largest number of points are arranged on the graph shown in (a) of FIG. 11 by Hough transform, estimates a height and inclination of the road surface, and point data which are largely away from the portion and point data around which no other data exist are removed as noise. When a stereoscopic object such as a pedestrian exists, the parallax data around the stereoscopic object are also removed based on a detection result of the stereoscopic object which is the past information. As described above, the noise removing unit 430 removes analysis points other than analysis points on the road surface and unreliable point data.

Figure 12:
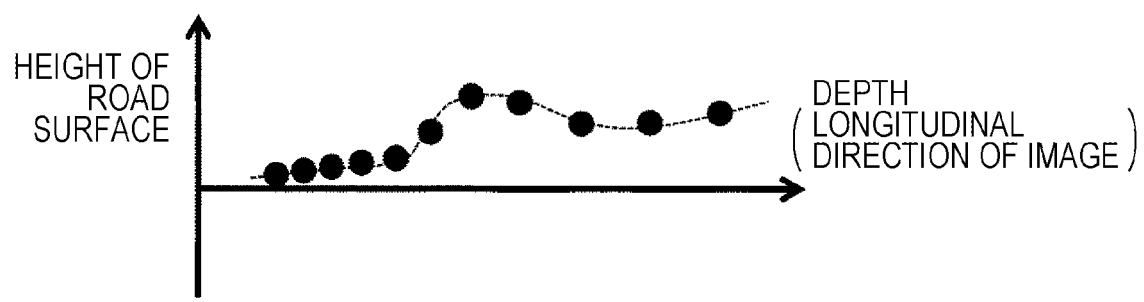
FIG. 12 is a view for describing processing contents of road surface cross-sectional shape estimation.

However, the remoter the points which are measured as shown in (a) of FIG. 11, the smaller the number of point data becomes. This is because although the measurement is performed every 1 pixel on a parallax image, the remoter the point data, the lower the resolution becomes in terms of distance. In estimating the shape of the road surface, by slightly increasing the number of data on measurement points (black dots in a graph shape), a range which covers measurement errors and areas where the measurement cannot be performed can be widened. However, also in actual traveling, a posture or the like of a vehicle considerably changes. Accordingly, unless the postures of the cameras and the road surface are not corrected, it is not possible to analyze a shape of the road surface by integrating time-sequential data. Therefore, in a time sequence unit 440, the reference road surface is estimated based on the data from which noise has been removed in each frame, and based on the posture of the estimated road surface, data is integrated by correcting the posture of the road surface of the actual frame by the posture of the road surface and an own vehicle movement amount in other frames. FIG. 12 shows a result of recognition in a case where an obstacle exists on the road surface.

Finally, since the cross-sectional shape of the road surface obtained using these data is not always a straight line, the cross-sectional shape estimation unit 450 performs curved line fitting. Such curved line fitting can cope with a change in shape such as a slope or a bump. Further, in a case where the measurement point largely deviates from the estimated curved line and no measurement point in the different frame exists around the measurement point in the primary fitting, noise is removed and secondary fitting is performed. Furthermore, in a case where the number of measurement points is still insufficient even when the data of the respective time sequence are used, an image which is inappropriate for stereo matching is inputted in the current stereo-vision area so that the road surface cross-sectional shape is not accurately estimated. The cross-sectional shape estimation unit 450 also determines that the cross-sectional shape estimation unit 450 is in an unusable state.

Figure 4:
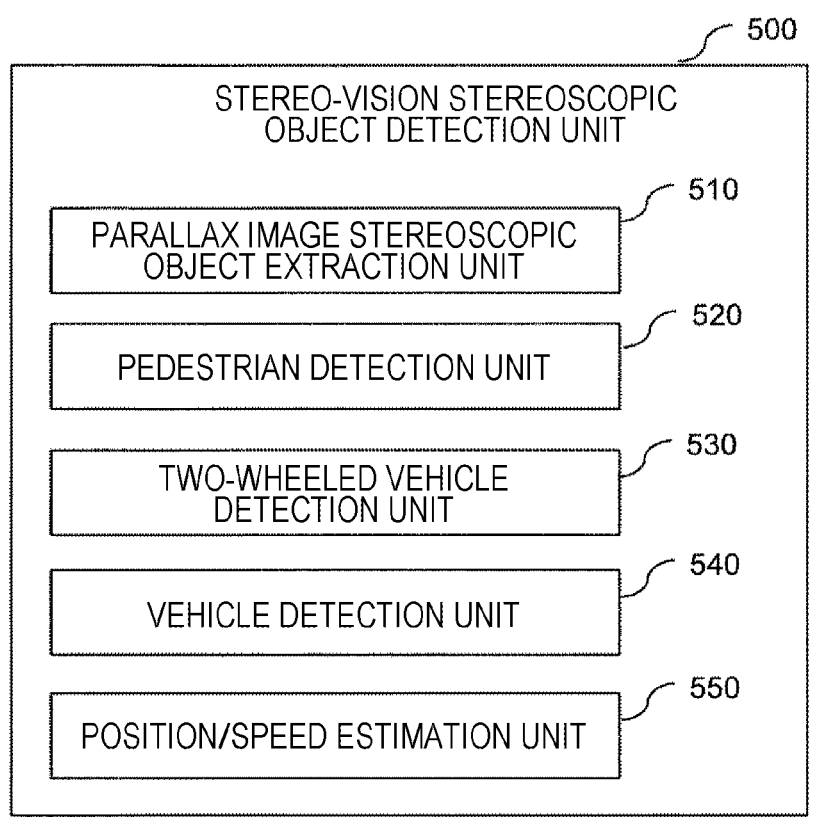
FIG. 4 is a block diagram showing the configuration of a stereo-vision stereoscopic object detection unit.

FIG. 4: Stereo-Vision Stereoscopic Object Detection Unit

FIG. 4 is a block diagram showing the configuration of the stereo-vision stereoscopic object detection unit. The stereo-vision stereoscopic object detection unit 500 extracts a stereoscopic object from a parallax image obtained by stereo vision, and identifies what the obtained stereoscopic object is. That is, the stereo-vision stereoscopic object detection unit 500 identifies a kind of the stereoscopic object by performing identification for respective kinds such as a pedestrian, a two-wheeled vehicle, a vehicles or the like. Further, for every obtained stereoscopic object, the position and the speed of the stereoscopic object are estimated by further performing a detailed analysis of the inside of a rectangular shape which includes the stereoscopic object.

First, the parallax image stereoscopic object extraction unit 510 extracts a stereoscopic object from a parallax image. Using the height of the road surface estimated by the road surface cross-sectional shape estimation unit 400 as the base, a parallax of the road surface and a parallax of a noise factor located at a position lower than the road surface and the like are deleted. When the height of the road surface does not largely differ between the left and right processing areas, a parallax of the height of the road surface is removed using an average value. On the other hand, when the height of the road surface largely differs between the left and right processing areas, a parallax of the height of the road surface is removed using an interpolation value in an area between the processing areas, the height of the road surface of the processing area on a left side with respect to a left outside, and the height of the road surface of the processing area on a right side with respect to a right outside. With such processing, a parallax image in which only an object existing at a position higher than the road surface remains is formed. With respect to the parallax image in which only the stereoscopic object at the position higher than the road surface remains, segmentation is performed so that parallaxes collected in a certain area are determined as a lump. By collecting objects existing near also with respect to a depth in a three dimension (parallax value) besides the position on an image as one object, a three dimensional stereoscopic object extracted.

Identification of a stereoscopic object candidate extracted in this manner is performed by a pedestrian detection unit 520, a two-wheeled vehicle detection unit 530, and a vehicle detection unit 540. First, with respect to stereoscopic objects formed by the stereoscopic object extraction unit 510 from a parallax image, it is determined whether the stereoscopic object is to be set as an object to be identified based on whether or not the stereoscopic object is excessively small or large as a three-dimensional shape of an object to be detected. For example, in the case of the detection of a pedestrian, a threshold value on a minimum side is set to less than 60 cm with respect to a height and less than 10 cm with respect to a width, and when the stereoscopic object is less than either one of the above-mentioned threshold values, the stereoscopic object is excluded from objects to be identified. On the other hand, also when the stereoscopic object exceeds a height of 220 cm or a width of 120 cm, the stereoscopic object is excluded from objects to be identified because of a high probability that the stereoscopic object is not a pedestrian. Similarly, also in the detection of a two-wheeled vehicle or in the detection of a vehicle, when the stereoscopic object is smaller than a predetermined size or larger than a predetermined size with respect to the two-wheeled vehicle and the vehicle respectively, the stereoscopic object is excluded from objects to be identified. (These numerical values are merely examples, and optimal numerical values may be used as desired.) Further, with respect to these stereoscopic objects to be identified, the identification is performed in order from the stereoscopic object having a larger risk by taking into account the possibility of collision of the stereoscopic object with the own vehicle.

Unless such processing is taken, when the number of objects to be processed is increased, there arises a concern that a pedestrian at a close distance in front of a vehicle cannot be detected within a predetermined cycle although an object at a remote position which the vehicle will not collide is detected. By performing processing by taking into account priority, it is possible to stably track an object which becomes an object to be controlled within the predetermined cycle.

The pedestrian detection unit 520 identifies a stereoscopic object which becomes a pedestrian candidate in order of priority by taking into account the collision of the stereoscopic object with the own vehicle. The pedestrian detection unit 520 performs identification in advance whether or not it is appropriate to regard a stereoscopic object as a pedestrian using a result acquired by learning by making use of correct value data. Similarly, the two-wheeled vehicle detection unit 530 performs identification of a two-wheeled vehicle, and the vehicle detection unit 540 performs identification of a vehicle. After these detection units perform the identification of stereoscopic objects respectively, these detection units perform the estimation of the positions and speeds of the stereoscopic objects. With respect to the speed, when an object is detected as a stereoscopic object also in all frames, the speed is estimated based on a movement amount of the object. Since the image is parallax image, the rough position of a stereoscopic object can be readily identified by using an average value of parallaxes in a rectangular area determined to be the stereoscopic object. However, in the case of a pedestrian, a two-wheeled vehicle or a vehicle which is a mobile body that requires accuracy particularly in determining the position, it is necessary to provide information on the position and the speed of the mobile body which is as accurate as possible. In view of the above, in the position/speed estimation unit 550, with respect to a pedestrian, a two-wheeled vehicle or a vehicle which is identified, the parallaxes in the rectangular shape are analyzed, parallax values which largely differ in depth are removed since these parallax values are considered as a background. Further, edges in the rectangular shape are analyzed so as to estimate an edge boundary between an object portion and the background, and the position of center of gravity is measured with high accuracy by using only the parallaxes inside the edge boundary. Furthermore, in the case where the object is a two-wheeled vehicle or a vehicle, the posture of the object can be also calculated while also calculating the inclination of the object by detecting a change in parallax values inside the object. High accuracy in identification is achieved by using the above-mentioned result obtained by the position/speed estimation unit 550 in combination with a posture estimation result obtained by an identifier.

Figure 5:
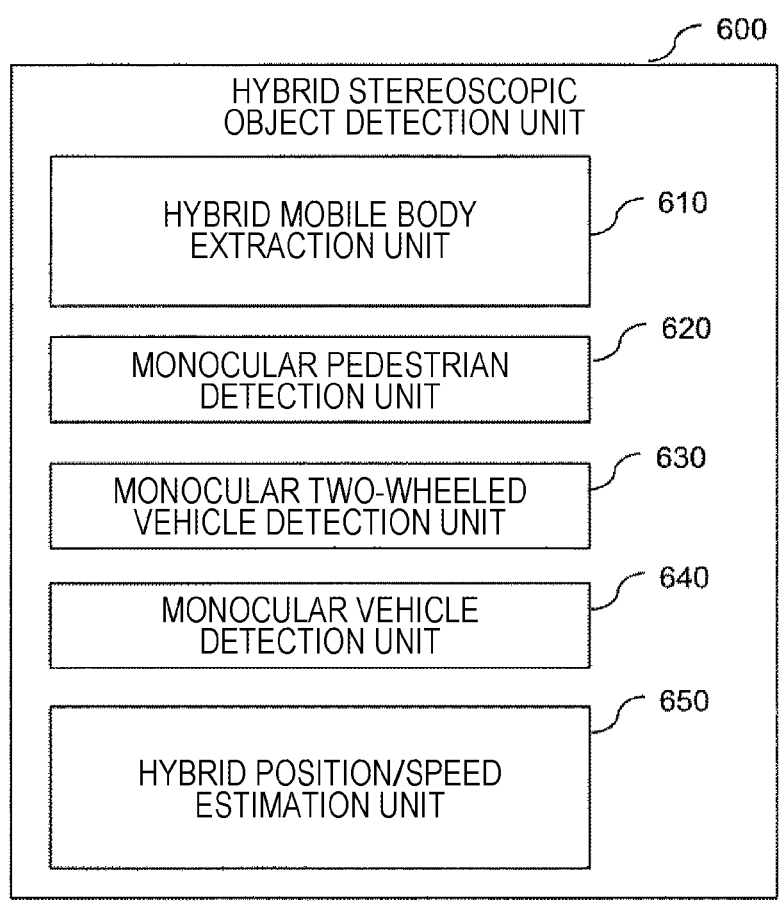
FIG. 5 is a block diagram showing the configuration of a hybrid stereoscopic object detection unit.

FIG. 5: Hybrid Stereoscopic Object Detection Unit 600

FIG. 5 is a block diagram showing the configuration of the hybrid stereoscopic object detection unit. The hybrid stereoscopic object detection unit 600 detects a hybrid stereoscopic object in such a manner that a stereo-vision area of a stereo camera and a monocular-vision area shown in FIG. 9 exist in coordinate system where a stereo-vision area and the monocular-vision area are positioned laterally on one image and the stereo vision and the monocular vision are merged with each other in one image state as shown in a lower portion of FIG. 9, and information on the stereo vision is used in the monocular vision by using the above-mentioned relationship.

First, in the hybrid mobile body extraction unit 610, the movement on the image is analyzed by using a flow extraction method which is performed in general in monocular image processing. As shown in (a) of FIG. 13, the flow extraction method can easily tracking the time sequential movement of the corners which can be easily used as features on the image. Since the image is an image captured by the cameras mounted on the own vehicle, the imaged object moves on the image as the own vehicle advances. In this case, feature amounts of the corners on the image are analyzed. By estimating that there is extremely high probability that the same corners will have the similar feature amounts in the next frame, a result of tracking the corners on the image which change time-sequentially is expressed as the movement on the image by arrows. The image is not a real image and hence, the arrows are drawn also on the road surface where the textures do not exist. In actual processing, since tracking of the corners can be performed when a pattern exists to some extent on a road surface where the textures or the feature amounts are relatively small, the arrows for an explanation purpose are drawn on the road surface. As described above, basically, the background flows outward as the own vehicle advances. In such an image, an object which is going to collide with the own vehicle is basically an object which moves inward. Accordingly, a mobile body which is going to enter a collision course is found by analyzing the movement flow of the corners on this image.

In a scene shown in (a) of FIG. 13 where the corners can be found relatively easily, a mobile body which is an object to be found can be relatively easily found. However, when a moving speed of a pedestrian or a bicycle is slow, or when the vehicle jolts due to pitching during turning or the like, the number of noise factors is increased in the movement of the background. Accordingly, the number of cases is not a few where the position of the mobile body cannot be easily found even when the flow on the image shown in (a) of FIG. 13 is observed. In such a case, a differential between the movement of the background flow and the movement of the object to be found becomes small and hence, the separation of the object to be found from the background flow becomes difficult. In such a case, further, the movement of the background is predicted from the own vehicle behavior, and an amount of this movement of the background is subtracted from the movement on the image shown in (a) of FIG. 13. Accordingly, the movement of a pedestrian or a bicycle which is a mobile body is enlarged, and movement amounts of noise components remain small on the background itself thus realizing processing where the mobile body can be easily found. In such processing, at the time of estimating the movement flow of the background, the estimation of the movement of the background with high accuracy which utilizes information on a stereo vision is utilized. With such processing, as shown in (b) of FIG. 13, a differential of the movement of the background can be predicted with high accuracy. Accordingly, the mobile body can be extracted and detected with high accuracy based on a differential of the movement of the background compared with monocular image processing. However, also in this case, basically, the background is unknown. Accordingly, the prediction of the movement is performed by estimating that the background is wholly the road surface. Accordingly, the technique according to this embodiment becomes a technique which extracts not only a mobile body but also a stereoscopic object. Although a mobile body which invades an own vehicle advancing road is a main object to be recognized, this technique can also extract a stereoscopic object which is a stationary object. In this manner, by tracking a stereoscopic object and a mobile body found in a single frame time sequentially, only a stereoscopic object which is determined as a stereoscopic object or a mobile body which can be stably tracked for each frame can advance to next identification processing.

Next, in a monocular pedestrian detection unit 620, a monocular two-wheeled vehicle detection unit 630, and a monocular vehicle detection unit 640, stereoscopic objects which can be extracted and tracked by the above-mentioned hybrid mobile body extraction unit 610 are identified in order of priority of possibility of collision and possibility of becoming an object to be controlled based on the position and the speed.

The monocular pedestrian detection unit 620 selects a stereoscopic object which becomes a pedestrian identifying object based on sizes and aspect ratios of stereoscopic objects and mobile bodies extracted from the hybrid mobile body extraction unit 610, identifies the stereoscopic objects and the mobile bodies, evaluates the probability of being a pedestrian using a plurality of frames, and determines whether or not the stereoscopic object is a pedestrian based on images in minimum three frames.

Similarly, the monocular two-wheeled vehicle detection unit 630 selects a stereoscopic object which becomes a two-wheeled vehicle identifying object based on sizes and aspect ratios of stereoscopic objects and mobile bodies extracted from the hybrid mobile body extraction unit 610, identifies the stereoscopic objects and the mobile bodies, evaluates the probability of being a two-wheeled vehicle using a plurality of frames, and determines whether or not the stereoscopic object is a two-wheeled vehicle based on images in minimum three frames.

Similarly, the monocular vehicle detection unit 640 selects a stereoscopic object which becomes a vehicle identifying object based on sizes and aspect ratios of stereoscopic objects and mobile bodies extracted from the hybrid mobile body extraction unit 610, identifies the stereoscopic objects and the mobile bodies, evaluates the probability of being a vehicle using a plurality of frames, and determines whether or not the stereoscopic object is a vehicle based on images in minimum three frames.

Figure 15:
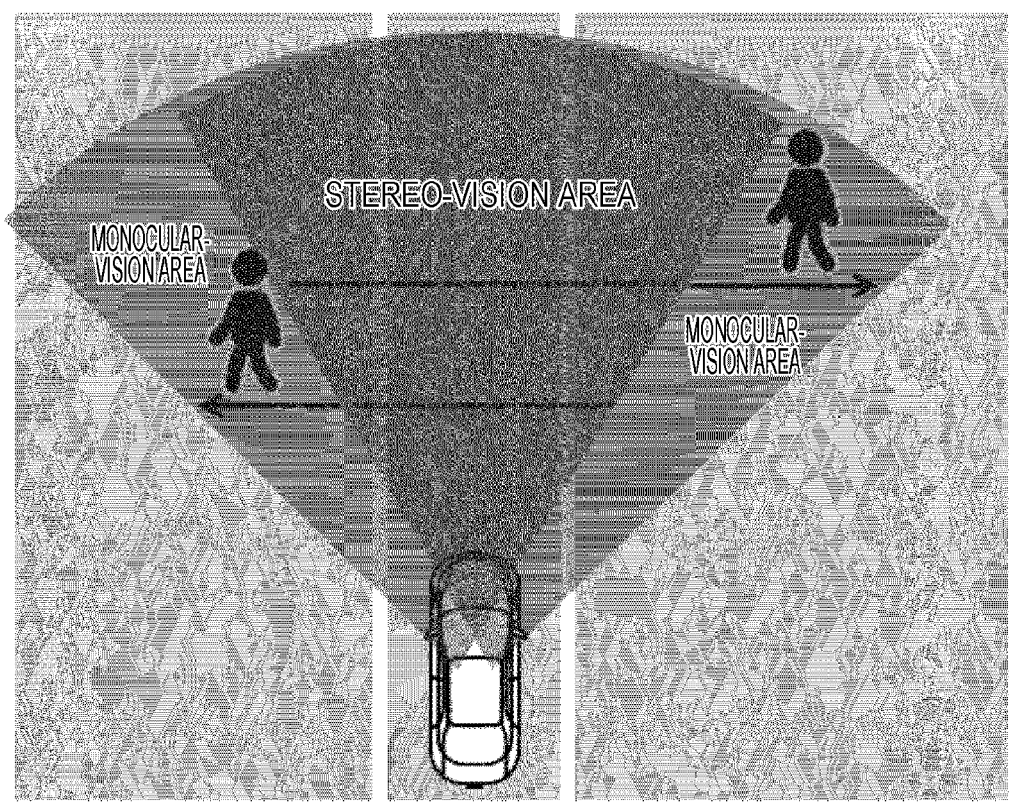
FIG. 15 is a view for describing distance calculation based on a hybrid method.

Next, a distance of the identified object is a distance in the monocular-vision area and hence, a stereo vision distance measurement method shown in (b) of FIG. 14 cannot be directly used. As shown in (a) of FIG. 14, a monocular-vision distance measurement method can be used. However, in one of general distance measurement methods by a monocular vision, on a condition that the position of a lower end of a stereoscopic object is located on a road surface, a distance can be calculated assuming that a camera height, camera angle, and the road surface are horizontal. However, in these techniques, when design values or the like are used in setting a camera height and a camera posture, a loaded weight, a riding position of a person, pitching, rolling or the like of a vehicle body which generates during traveling become error factors and hence, the measurement exhibits low accuracy. Further, in the case where an object to be identified is an object having known sizes, there is a technique which can calculate a distance with high accuracy. However, a vehicle ranges from a truck to a light vehicle and hence, such variations of the vehicles also become an error factor. In view of the above, in this embodiment, a stereo-vision area exists at the center. Accordingly, as shown in FIG. 15, the hybrid position/speed estimation unit 650 calculates a distance by a hybrid method which is utilized in such a manner that a distance obtained in the stereo-vision area located at the center is directly slid in the lateral direction to a position where a monocular-vision area exists. Accordingly, compared to a simple monocular vision distance measurement method, the distance measurement with high accuracy can be realized.

Further, there is a method where a depression angle of a camera is corrected at real time by a stereo vision or a monocular vision. However, such a method is difficult to perform distance measurement with high accuracy compared to a stereo method where a position and a posture of an object between two cameras is obtained with high accuracy at a factory as shown in (b) of FIG. 14. Accordingly, the technique of this embodiment which can directly use a distance measured by a stereo vision can measure a distance with high accuracy compared to the above-mentioned method.

Further, in the case where a road is a slope or a bump where a road surface is not flat and the shape of the road surface changes, a large error occurs in conventional methods where a road surface is assumed as a flat surface. Compared to such conventional methods, in the technique of this embodiment where a distance value obtained in a stereo-vision area is directly used by sliding in the lateral direction, even when the road surface has a slope or a bump shape, a distance measurement result by a stereo vision can be used and hence, the technique of this embodiment can realize the distance measurement with high accuracy compared to the conventional technique.

Basically, as shown in the lower portion of FIG. 9, a state where a coordinate system on one image can be shared in common is easy to use. However, in the case where the cameras used in the embodiment have a large distortion as in the case of a fisheye camera, for example, image processing is performed by correcting distortion only in a stereo vision and not correcting distortion in a monocular vision. Accordingly, although a correspondence relationship is obtained by converting a coordinate system on an image, a case is estimated where a common coordinate system cannot be directly used. However, when a distortion correction coefficient on an image is basically known, a correspondence relationship on the image whose distortion is corrected can be obtained by calculation. Assuming an object is located on a road surface, a coordinate which exhibits the same distance between a stereo vision and a monocular vision is obtained. Accordingly, as described previously, even when a camera having a large distortion such as a fisheye camera is used, distance measurement information obtained by a stereo vision can be also utilized in a monocular vision while calculating the correspondence relationship between information on a stereo-vision area and an area of a monocular vision. With such a technique, the performance of the onboard environment recognition device can be largely enhanced.

Figure 6:
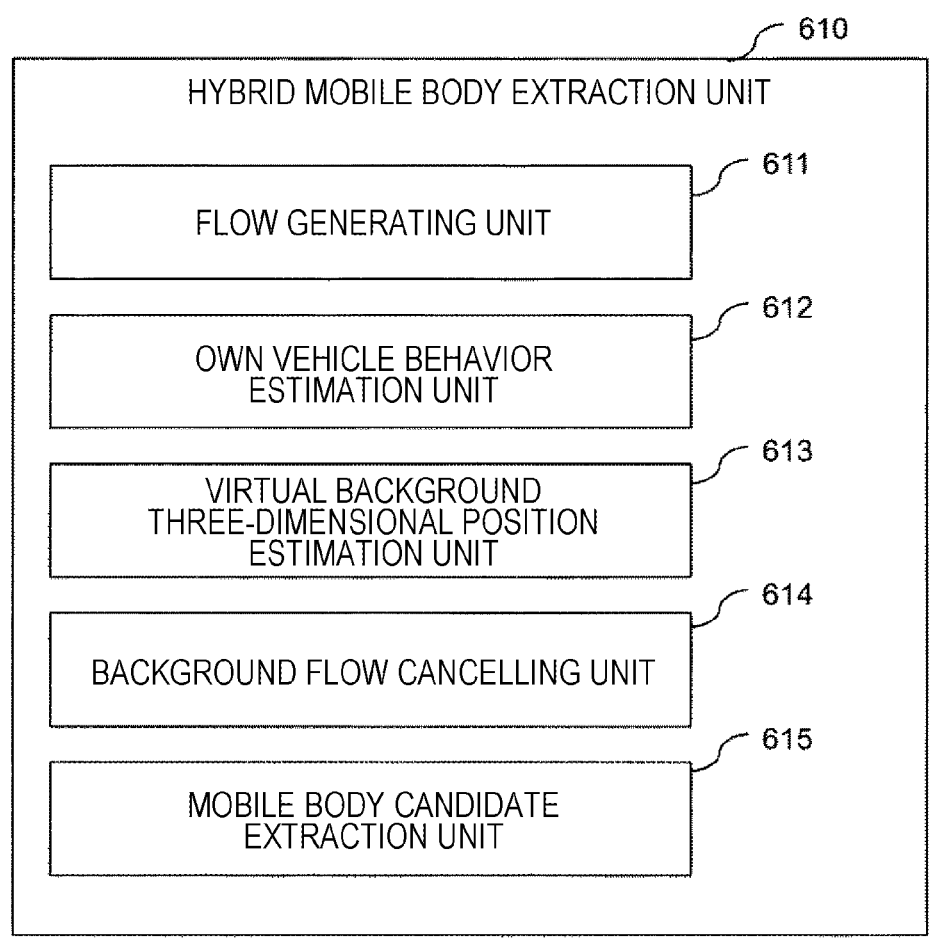
FIG. 6 is a block diagram showing the configuration of a hybrid mobile body extraction unit.

FIG. 6: Hybrid Mobile Body Extraction Unit 610

FIG. 6 is a block diagram showing the configuration of the hybrid mobile body extraction unit. The flow generating unit 611 performs processing for analyzing the movement on an image which is generally referred to as an optical flow. As a result of such processing, the flow generating unit 611 can analyze moving directions of feature points (corners) with time on an image shown in (a) of FIG. 13. In the result shown in (a) of FIG. 13, the directions indicated by arrows show a result of an analysis of the movement of the feature points on the image. Since FIG. 13 is a view provided for explanation, on the drawing, the arrows are drawn on places where the features do not exist. However, patterns exist in an actual road surface and hence, analysis of the flow can be performed although the density of the feature points is small.

Next, the flow generated by the flow generating unit 611 is the flow in which the movement of the background brought about by the movement of an own vehicle is contained. Accordingly, the flow is difficult to be used for extracting a mobile body or a stereoscopic object.

In view of the above, it is desirable to generate the flow only with respect to only the mobile body and the stereoscopic object by cancelling the movement of the background on the flow as much as possible by using the own vehicle behavior. Accordingly, first, the own vehicle behavior is estimated by the own vehicle behavior estimation unit 612 based on information such as a vehicle speed and yaw rate by utilizing CAN information of the own vehicle. Next, a virtual background three-dimensional position estimation unit 613 estimates a virtual three-dimensional position of the background. As shown in (a) of FIG. 16, corresponding to the position of the monocular-vision area, a depth of the monocular-vision area and a depth of the stereo-vision area are equal, and the lateral position of an object can be calculated based on a depth and an abscissa on the image. Using a result of such processing, in the virtual background three-dimensional position estimation unit 613, the three-dimensional position which is a position where the movement of the background is to be estimated can be estimated.

Next, in a background flow cancelling unit 614, with respect to the three-dimensional positions for respective pixels obtained by the virtual background three-dimensional position estimation unit 613, the own vehicle behavior amounts obtained by the own vehicle behavior estimation unit 612 are calculated as three-dimensional movement amounts in the flow, and the number of pixels which are moved on the image as the flow and the direction that the pixels are moved are calculated again. By subtracting the movement amount of the background of the road surface from the flow generated by the flow generating unit 611, in case of the road surface, the movement of the flow is cancelled by the background flow cancelling unit 614 such that the flow becomes zero. Accordingly, assuming that an entire object projected on the image is a road surface, the movements of all objects become zero. Accordingly, as shown in (b) of FIG. 13, although the movement on the road surface remains as the movement by an error amount, basically, a movement amount becomes zero.

On the other hand, the movement of the flow is in a background flow cancel state where the background is assumed as the road surface such that the flows indicated by arrows are kept extending at a high portion of a stereoscopic object, that is, an area on the tree shown in (b) of FIG. 13. Accordingly, the flow remains with respect to a stereoscopic object having a large height. Further, with respect to a bicycle or a pedestrian, since the movement of the background becomes zero, the movement of the bicycle or the pedestrian can be extracted as the large movement which can be easily recognized on the image.

In this embodiment, the positional accuracy of the road surface can be utilized by shifting the depth which is obtained in the stereo-vision area with high accuracy in the lateral direction. Accordingly, the background flow of the road surface can be cancelled with high accuracy and hence, an error amount of the flow remaining on the road surface can be made extremely small. With such processing, a smaller stereoscopic object, a pedestrian with a small movement and the like can be also recognized with high accuracy. In the mobile body candidate extraction unit 615, in a state where the movement of the background is cancelled as described above, candidates for a mobile body and a stereoscopic object are extracted by grouping a set of vectors of the flow. Although the term "mobile body candidate extraction unit 615" is used in this embodiment, the mobile body candidate extraction unit 615 adopts a technique which extracts also a stereoscopic object simultaneously with the mobile body.

Figure 7:
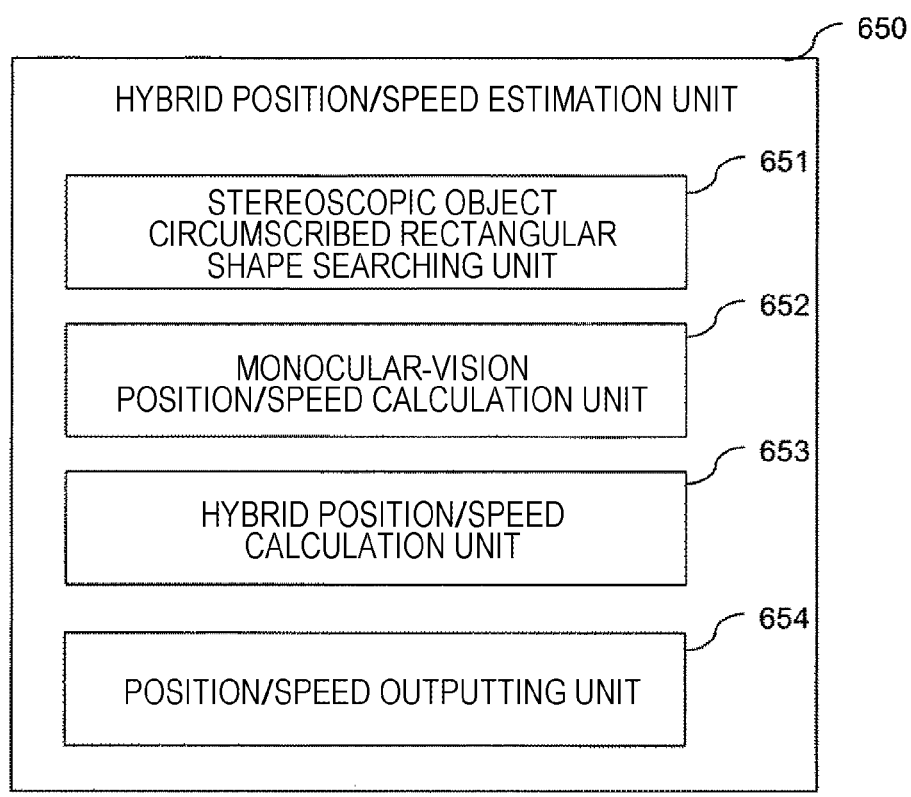
FIG. 7 is a block diagram showing the configuration of a hybrid position/speed estimation unit.

FIG. 7: Hybrid Position/Speed Estimation Unit 650

FIG. 7 is a block diagram showing the configuration of the hybrid position/speed estimation unit. In the hybrid position/speed estimation unit 650, the position and the speed are estimated in order of relatively higher priority with respect to a stereoscopic object and mobile body extracted by the hybrid mobile body extraction unit 610, and more particularly to objects identified by the monocular pedestrian detection unit 620, the monocular two-wheeled vehicle detection unit 630 and the monocular vehicle detection unit 640. In this embodiment, in the case where a three-dimensional position in the stereo-vision area is utilized, in a state where parallaxes are extremely small in the stereo-vision area or in a state where an obstacle exists at a close distance position from the vehicle so that cameras cannot see the road surface, the final position and the final speed are estimated by switching the distance measurement to the distance measurement in a monocular vision.

The actual processing is specifically described by estimating a pedestrian, for example. As shown in (b) of FIG. 16, a three-dimensional position of a pedestrian is estimated in both a monocular vision and a stereo vision using a foot position of the pedestrian as a base. Accordingly, processing for further identifying the position of the foot is performed by utilizing a rectangular shape of an object used at the time of identification or by utilizing a rectangular shape which a result of grouping of the mobile body embraces when the mobile body is extracted by the hybrid mobile body extraction unit.

Edges in the vertical direction on the image are searched on boundaries with the road surface by utilizing the edges or similarity of brightness. Further, a texture of the edge is compared with a texture of an object so as to find a boundary including a different feature from the road surface. When the objects are identified, features corresponding to these objects are set. For example, if the object is a vehicle, a search is made so as to find a contact between the road surface and a contact surface of a tire. Alternatively, in the case of the center of the vehicle, a gap exists between a bottom surface of the vehicle and the road surface. Accordingly, the bottom surface of the vehicle body surely forms a shade which is dark and hence, a search is made to find a boundary between the road surface and the vehicle. In the case of a pedestrian, with respect to a pedestrian who is moving, processing is performed so as to find a shape of a leg portion which can easily form a flow different from an upper half body or a head portion or a boundary between a road surface and a foot. In case of a bicycle, a circular shape or an elliptical shape of a tire of the bicycle is found, and a lower portion of this circular or elliptical shape becomes a ground contact position. By utilizing the information, the stereoscopic object circumscribed rectangular shape searching unit 651 performs searching of the position of the foot of the stereoscopic object again.

Utilizing this foot position, the monocular-vision position/speed calculation unit 652 performs the position estimation in monocular vision. Regardless of whether or not the position and speed can be calculated in stereo vision, when the distance measurement in monocular vision is possible, the distance measurement is performed. Based on the circumscribed rectangular shape of the pedestrian obtained as shown in (b) of FIG. 16, utilizing position/posture information of the cameras, the calculation of the three-dimensional position by the monocular cameras is performed as shown in (a) of FIG. 14. By repeatedly performing such processing for every frame, a change in position can be also analyzed, and a moving speed of an object can be also calculated. Results obtained in some frames are stored, and filtering is applied to the stored results and hence, relatively stable speed information is obtained and utilized.

Also in this distance measurement in monocular vision, prediction accuracy changes between the case where a vanishing point position is calculated by utilizing lane recognition or the like and the corrected camera posture is utilized and the case where initial parameters or design values set at a factory are utilized. In this processing, what kind of information can be utilized is checked. Further, in this scene, assuming that the probability of acquiring highest accuracy is high when the distance measurement in monocular vision is performed using this technique, the correction of the camera position and posture performed using the technique having high reliability, and measurement of distance in monocular vision is performed.

Similarly, the hybrid position/speed calculation unit 653 also calculates the distance as shown in (b) of FIG. 16 using the foot position of an object as the reference by utilizing the assumption that a depth of a road surface at the foot position is equal to a depth of the road surface in stereo-vision area corresponding to pixels at the same height on an image. In the same manner as the monocular vision, by performing this processing for every frame, a change in position of an object is analyzed, and a moving speed of the object is estimated. In such processing, as a matter of course, after confirming that cross-sectional shape of the road surface in stereo vision is normally estimated, this three-dimensional position is used.

The position/speed outputting unit 654 determines which result is to be outputted out of the position/speed calculation result in monocular vision and the hybrid position/speed calculation result. Whether or not the distance measurement is to be switched to the distance measurement in monocular vision is determined by taking into account reliability of a road surface cross-sectional shape of the stereo-vision area based on reliability of stereo-vision area or the like including whether or not a state where outputting of the road surface cross-sectional shape can be used from the beginning. The information which is to be used finally is a result of hybrid position speed calculation, and information relating to reliability is also outputted.

Which one out of the position/speed result in monocular vision and the position/speed result in hybrid is to be utilized finally is outputted to an alarm control unit 700 including prediction accuracy, a time sequential change and the like of the respective results.

Figures 17, 18:
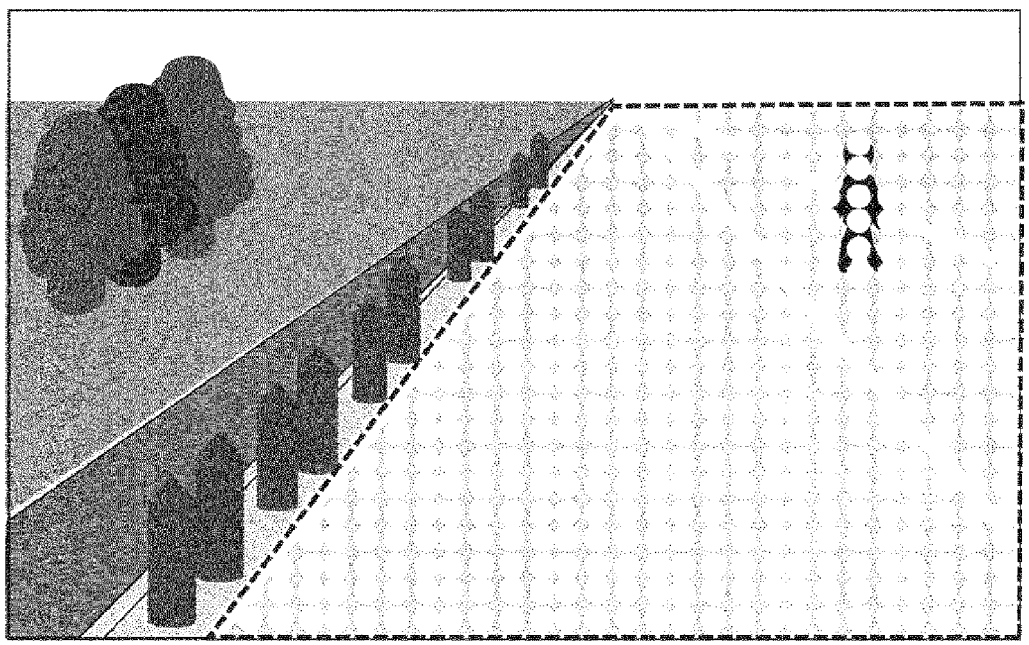
FIG. 17 is a view for describing the difference between distance measurement techniques.
FIG. 18 is a view for describing accuracies of respective areas on an image.

Further, the hybrid mobile body extraction unit 610 performs the following determinations using an image shown in FIG. 18. The hybrid mobile body extraction unit 610 determines that an own vehicle traveling lane and a right side of the own vehicle traveling lane have heights substantially equal to a road surface height. On the other hand, the hybrid mobile body extraction unit 610 determines that a fence exists on a left side of the own vehicle traveling lane, and also pedestrian sidewalk and a ground higher than the traveling lane exists beyond the fence. The hybrid position/speed estimation unit 650 determines that an area which can utilize position measurement of high accuracy is the own vehicle traveling lane and an area on the right side of the own vehicle traveling lane which is estimated to have substantially the same road surface height. On the other hand, from the fence disposed on the left side of the own vehicle traveling lane and an area on the left side of the fence, the hybrid position/speed estimation unit 650 determines that, regardless of the position speed calculation in monocular vision or the position speed calculation in hybrid, an error occurs in a position/speed estimation technique which performs calculation on a premise that an object stands at the same height as the own vehicle traveling lane so that accuracy of estimation is lowered regardless of position/speed calculation in monocular vision or the position/speed calculation in hybrid. As shown in FIG. 18, the determination can be made with high accuracy in a polka dot area disposed on a right side of the drawing, and the determination can be made with low accuracy in a whole area on the left side in the drawing. In the case where a distance measurement technique which uses data where sizes of a stereoscopic part are known and the like are also utilized, the accuracy of such distance measurement technique is not lowered. However, such a technique has an effect on the distance measurement in monocular vision and the hybrid distance measurement where a position and a speed are obtained based on a condition that a stereoscopic object stands at the same height as the own vehicle traveling lane as a reference. In the case where a three-dimensional position is restored by utilizing the previously mentioned condition that the sizes of the stereoscopic object are known or from two images in frames which differ in time when a mobile body is in a stationary object state or moves in a predetermined direction at a predetermined speed, when the stereoscopic object is directly measured in stereo vision, the accuracy of the measurement is not affected. The information is utilized in such a manner that the information affects the technique of this embodiment which measures distance on an assumption that a stereoscopic object stands on a road surface in the distance measurement technique, and the information is reflected on accuracy and reliability of the technique. Accordingly, the information can be utilized for adjusting timing of an alarm and control and hence, an erroneous alarm and erroneous control can be suppressed.

In an estimating an area having a height different from a height of the own vehicle traveling lane, a height of a stepped portion may be estimated based on the difference in a length of a flow. In this case, in measuring a height of a stereoscopic object standing in the area having the height different from the height of the own vehicle traveling lane, the height of the stereoscopic object is corrected by a road surface height amount and hence, a more accurate distance measurement result can be obtained. When a distance of a stereoscopic object standing on a road surface having a road surface height different from a road surface height of the own vehicle traveling lane is lower than a distance of the own vehicle traveling lane, erroneous distance measurement is made such that the distance is a close distance. On the other hand, when the distance of the stereoscopic object is higher than the distance of the own vehicle traveling lane, erroneous distance measurement is made such that the distance is a remote distance. A distance measurement result corrected by utilizing such erroneous distance measurement. Alternatively, the distance measurement result may be treated as it is, that is, the error is large and the reliability of the distance measurement result is low.

Figure 8:
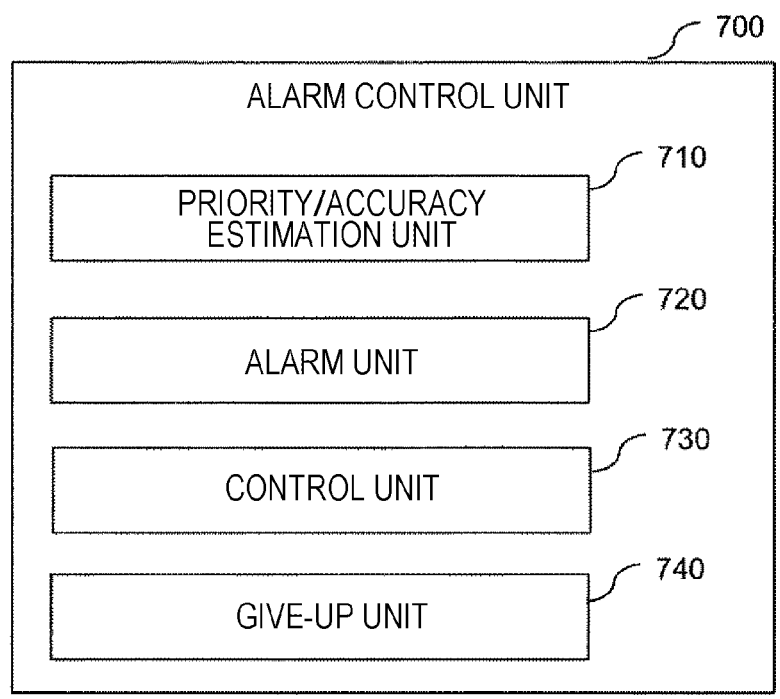
FIG. 8 is a block diagram showing the configuration of an alarm control unit.

FIG. 8: Alarm Control Unit 700

FIG. 8 shows a block diagram showing the configuration of the alarm control unit. The alarm control unit 700 performs an alarm and control for enhancing safety and convenience in response to a result detected by the stereo-vision stereoscopic object detection unit 500 and a stereoscopic object result detected by the hybrid stereoscopic object detection unit 600.

First, based on stereoscopic object information detected by two kinds of sensing areas, an object which becomes of a target of an alarm and control is narrowed down, and a priority/accuracy estimation unit 710 decides priority by also utilizing accuracy information and a position speed of the object. Then, the alarm control unit 700 generates an alarm by an alarm unit 720, control is performed y the control unit 730 or, when necessary, performs a give-up operation by a give-up unit 740

The priority/accuracy estimation unit 710 classifies the accuracy of the position and speed according to the kinds of a distance measurement technique method, and adjusts the contents of, the control contents of an alarm and control, control timing and the like. Also, the fact that the reliability or the like changes even the distance measurement technique uses the same kind of method is utilized.

First, as an overview of the distance measurement method, there are roughly four distance measurement techniques as shown in FIG. 17. These four methods are: 1) a monocular-vision distance measurement technique, 2) a monocular-vision corrected distance measurement technique, 3) a stereo predicted distance measurement technique, and 4) a stereo-vision distance measurement technique. The method in monocular vision is a method where a road surface is assumed as a flat plane and a camera height and a posture take fixed values. The monocular-vision corrected distance measurement technique is a technique where the accuracy of the monocular-vision distance measurement method is improved while correcting a road surface and camera heights. The stereo predicted distance measurement technique is a distance measurement technique which utilizes a depth estimation result of a stereo vision area located on a lateral side of a foot position of a stereoscopic object as shown in (b) of FIG. 16. Finally, the stereo-vision distance measurement technique is a technique for measuring the distance by directly utilizing parallax information existing in an object. This method is a stable and most accurate method. When the existence of object is correct, and accuracy of the distance measurement method is in a normal state, accuracy is improved gradually in order of 1) the monocular-vision distance measurement technique, 2) the monocular-vision corrected distance measurement technique, 3) the stereo predicted distance measurement technique, and 4) the stereo-vision distance measurement technique. 4) The stereo-vision technique exhibits highest accuracy and reliability.

Accordingly, as shown in FIG. 17 where a corresponding relationship between the distance measurement technique and alarm control is described, an alarm and a range where control can be performed on an axis of abscissas are controlled corresponding to reliability and accuracy of a distance measurement technique taken on an axis of ordinates. When the distance measurement can be performed in a stereo vision, an alarm is performed at an initial stage and, when desired, after acceleration control is performed, weak deceleration or strong deceleration is performed so as to generate braking for preventing a collision. In the case of the distance measurement which utilizes a stereo vision or a stereo predicted distance measurement, an alarm is performed at an initial stage when an obstacle approaches a vehicle and, thereafter, when the vehicle is going to collide with the obstacle, an alarm is performed in an initial stage and, thereafter, suppressed acceleration and weak deceleration continues. Since the measurement of distance is performed by expanding a result in a stereo-vision area to a monocular-vision area, there is also a possibility that an error occurs in the position and the speed obtained by the distance measurement to some extent. Accordingly, alarm control corresponding to a distance measurement means is changed such that the deceleration of the vehicle is held at weak deceleration, and strong braking is applied only when the vehicle enters a stereo vision view field range.

When the cameras are in a state where neither the distance measurement in a stereo vision nor a stereo predicted distance measurement technique can be used, a distance measurement method using a monocular vision is utilized. In this case, in the case where the position and the speed become stable even when reliability of identification is high, alarm control mainly focusing on calling of an attention by an alarm and the reduction of an accident damage obtained by suppressed acceleration is performed to an extent that driving by a user is not obstructed as much as possible.

Figure 19:
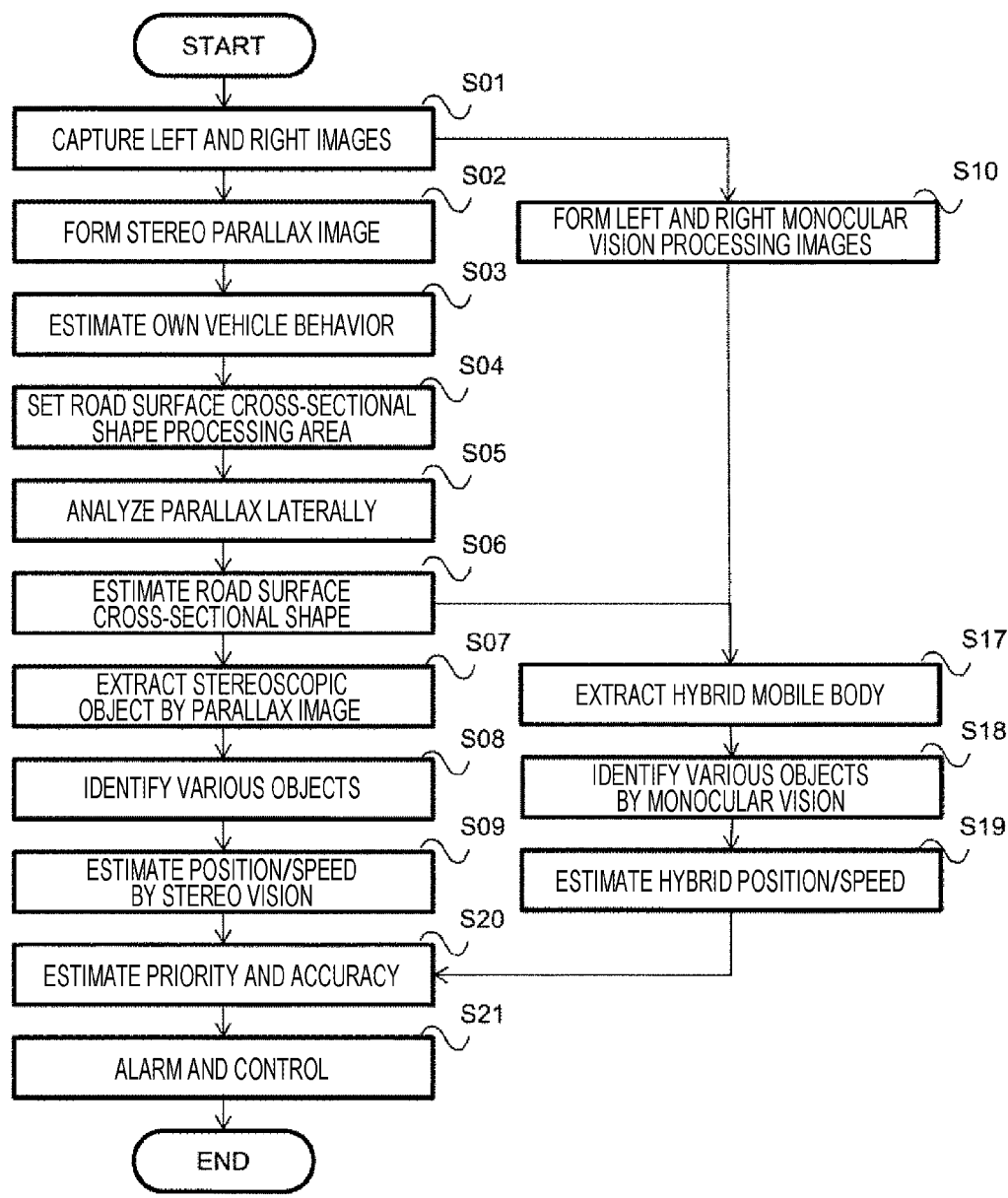
FIG. 19 is a flowchart showing processing adopted by this embodiment.

FIG. 19: Processing Flowchart

FIG. 19 is a processing flowchart.

S01: First, left and right images are captured by a stereo camera.

S02: A parallax image is formed for a stereo vision.

S03: To decide a processing area having a road surface cross-sectional shape, and to cancel the movement of a background for extracting a mobile body, the estimation of the own vehicle behavior is performed.

S04: A processing area for estimating a road surface cross-sectional shape in accordance with an estimation result of the own vehicle behavior is estimated.

S05: Parallaxes in the set processing area are voted in the lateral direction, and an observation value of the road surface cross-sectional shape is obtained for respective depths separately by making use of a most frequent value.

S06: By using time sequential data of the obtained observation values and by correcting the time sequential data based on the own vehicle behavior, it is possible to obtain a dense observation value where the time sequential observation values are superimposed with each other. By performing curve fitting having a road surface cross-sectional shape using such observation values, the road surface cross-sectional shape from which noise is removed can be estimated.

S07: A stereoscopic object is extracted by using the formed parallax image.

S08: Various identifications of a pedestrian, a two-wheeled vehicle, and a vehicle in a stereo-vision area are performed separately.

S09: A depth is estimated from the parallax image which utilizes a stereo vision, and a speed is estimated by utilizing a lateral position based on the depth and time sequential data.

S10: Out of the left and right cameras, in the camera used for capturing an image, an image for monocular processing is prepared by cutting out an image using an image area which does not form a stereo-vision area as a reference. With respect to a boundary between the stereo-vision area and the monocular-vision area, a margin is set by taking into account a superimposing region to some extent.

S17: By tracking time sequential images of feature points (corners) on the image by using a monocular-vision image, the moving directions of the image are analyzed as a flow. Further, the own vehicle behavior and the movement on the image assuming that the whole background is the road surface are estimated. By using a result of the calculated road surface cross-sectional shape of the road surface on the background in a stereo vision, the movement prediction of the road surface which uses a three-dimensional position where an effect brought about an error in a camera height and an error in a depression angle are suppressed can be performed.

Based on the movement of the feature points on an actual image, a data obtained by cancelling a predicted moving amount of the background from the own vehicle behavior is generated. Accordingly, the movement of the background on the image in monocular vision becomes approximately zero. To the contrary, a state is brought about where the movement of a stereoscopic object which does not exist on the road surface and the movement of a mobile body can be easily extracted such that the movement of the stereoscopic object and the movement of the mobile body emerge from the road surface.

A mobile body is extracted by analyzing by performing grouping to determine whether or not the movement of the mobile body is large compared to the surrounding background and the mobile body forms a mass.

S18: The identification of various kinds of mobile bodies (a pedestrian, a two-wheeled vehicle, and a vehicle) is performed by excluding objects which are apparently different in size from these objects to be identified by using an aspect ratio or the like of an object extracted as a mobile body.

S19: The estimation of position/speed is performed after assigning order of priority based on the own vehicle behavior to the above-mentioned identified objects and the objects which are extracted as the mobile bodies or stereoscopic objects although not identified.

In this case, a depth of the object is estimated by triangulation based on a simple monocular vision where a camera height from a foot position of a stereoscopic object and a camera posture are used. Then, a speed is estimated based on a time sequential change in this position.

Further, when a road surface cross-sectional shape is estimated in a stereo-vision area disposed at an upper lateral position on an image with respect to a foot position of a stereoscopic object, a depth is estimated with high accuracy by using a hybrid distance measurement result which directly utilizes depth information in a stereo vision, and the lateral position is calculated with high accuracy based on the depth. Further, the speed estimation can be performed with high accuracy by using a time sequential change at this position.

S20: Further, in this embodiment, priority order assignment is applied to objects of an alarm and control based on the positions and speeds of the stereoscopic objects and mobile bodies and the prediction of the own vehicle behavior. In this case, even when the accuracy differences which occur in the calculation method of the position and the speed are equal or the calculation methods are equal, an object to which an alarm and control are performed is finally decided using the difference in reliability or the like.

S21: An alarm and control are performed based on the above-mentioned priority.

As has been described above, according to the present invention, by using a plurality of cameras mounted on a vehicle, an obstacle is detected and distance measurement is performed in a stereo vision in a common view field area, and also a distance measured in the stereo-vision area is utilized also in a monocular-vision area. Accordingly, the obstacle detection and distance measurement with high accuracy can be performed compared to a simple monocular vision.

REFERENCE SIGNS LIST 1 onboard environment recognition device
100 left camera
110 right camera
200 stereo parallax image forming unit
210 exposure adjustment unit
220 sensitivity correction unit
230 geometric correction unit
240 matching unit
250 noise removing unit
300 left and right monocular image forming unit
400 road surface cross-sectional shape estimation unit
410 processing area decision unit
420 parallax lateral voting unit
430 noise removing unit
440 time sequence unit
450 cross-sectional shape estimation unit
500 Stereo-vision stereoscopic object detection unit
510 parallax image stereoscopic object extraction unit
520 pedestrian detection unit
530 two-wheeled vehicle detection unit
540 vehicle detection unit
550 position/speed estimation unit
600 hybrid stereoscopic object detection unit
610 hybrid mobile body extraction unit
611 flow generating unit
612 own vehicle behavior estimation unit
613 virtual background three-dimensional position estimation unit
614 background flow cancelling unit
615 mobile body candidate extraction unit
620 monocular pedestrian detection unit
630 monocular two-wheeled vehicle detection unit
640 monocular vehicle detection unit
650 hybrid position/speed estimation unit
651 stereoscopic object circumscribed rectangular shape searching unit
652 monocular vision position/speed calculation unit
653 hybrid position/speed calculation unit
654 position/speed outputting unit
700 alarm control unit
710 priority/accuracy estimation unit
720 alarm unit
730 control unit
740 give-up unit

The invention claimed is:

1. An onboard environment recognition device, comprising: two cameras arranged to sense; and
a controller;
the two cameras having two camera view fields includes a stereo-vision area and a monocular-vision area,
the controller configured to:
    determine an area having a height different from a height of an own vehicle traveling lane,
    search laterally a parallax image which is an output result of the stereo-vision area,
    estimate a road surface distance in the stereo-vision area,
    perform a lateral distance measurement of the monocular-vision area by expanding the estimated road surface distance to the monocular-vision area in a lateral direction,
    interpolate using a result of a curve fitting obtained by using a measurement result of a second distance instead of a first distance closer than the second distance, thus performing distance estimation by expanding the distance measurement result in the lateral direction in a case where the road surface distance of a portion of the stereo-vision area is less than a predetermined value in reliability when a distance measurement result of the own vehicle traveling road surface in the stereo-vision area expands in a lateral direction of the monocular-vision area, and
    predict occurrence of a distance error and use the distance error for an alarm, control or a timing adjustment, in a case where distance measurement technique for a stereoscopic object standing at a height different from the height of the own vehicle traveling lane is triangulation and a road surface is in a monocular vision, or in a case where a hybrid distance measurement is utilized.

2. The onboard environment recognition device according to claim 1, wherein the controller is configured to estimate the road surface distance in the stereo-vision area by setting an inside of an own vehicle traveling predicted lane, or an own vehicle traveling lane, in a processing area.

3. The onboard environment recognition device according to claim 2, wherein the controller is configured to:
    in a state where an unevenness exists in the processing area, estimate a road surface cross-sectional shape by removing the unevenness as a noise when the unevenness is less than a predetermined threshold value, and stop prediction in stereo vision and switch distance measurement to distance measurement in monocular vision when estimation of the road surface cross-sectional shape in the area where the unevenness exists is suppressed when the unevenness is equal to or more than the predetermined threshold value.

4. The onboard environment recognition device according to claim 1, wherein the controller is configured to:
   expand the estimated road surface distance in the lateral direction to the monocular-vision area,
   calculate a road surface moving prediction amount in the monocular-vision area, and
   detect a mobile body and/or a stereoscopic object using the road surface moving prediction amount in detection of the stereoscopic object.

5. The onboard environment recognition device according to claim 4, wherein the controller is configured to:
   calculate the road surface moving prediction amount in the monocular-vision area,
   apply a flow analysis to movement on an image of an object to be captured due to an own vehicle behavior on the image,
   detect at least one of the mobile body or the stereoscopic object by subtracting the road surface moving prediction amount due to the own vehicle behavior where the road surface is determined from the flow by laterally expanding the estimated road surface distance to the monocular-vision area and by using the road surface distance.

6. The onboard environment recognition device according to claim 1, wherein the controller is configured to perform a plurality of position estimation techniques which differ in distance measurement accuracy, the position estimation techniques including:
   a stereo-vision distance measurement technique;
   a monocular-vision distance measurement technique; and
   a hybrid distance measurement technique,
   wherein
   the controller is configured to change a content of an alarm or control in response to a distance measurement technique which measures an object by taking into account differently the distance measurement techniques.

7. The onboard environment recognition device according to claim 1, wherein the controller is configured to:
   determine the distance as a second distance closer than a first distance in a case where a distance of a stereoscopic object standing on a road surface having a road surface height different from a road surface height of the own vehicle traveling lane is lower than a distance of the own vehicle traveling lane, and
   determine the distance as the first distance which is remote as compared to the second distance and correct a distance measurement result, an alarm, or control timing by using the determination in a case where the distance of the stereoscopic object is higher than the distance of the own vehicle traveling lane.

* * * * *